(12) United States Patent
Godfrey et al.

(10) Patent No.: US 12,728,992 B2
(45) Date of Patent: Sep. 8, 2026

(54) FLYWHEEL STABILIZED SYSTEM FOR DEPLOYING A FREE-FALLING PAYLOAD FROM AN AERIAL VEHICLE AND METHODS OF USE THEREOF

(71) Applicant: Ocean Alliance, Inc., Gloucester, MA (US)

(72) Inventors: Jonathan Mark Godfrey, Natick, MA (US); Christopher James Zadra, Gloucester, MA (US); Iain Alistair Eddy Kerr, Gloucester, MA (US)

(73) Assignee: Ocean Alliance, Inc., Gloucester, MA (US)

( * ) Notice: Subject to any disclaimer, the term of this patent is extended or adjusted under 35 U.S.C. 154(b) by 0 days.

(21) Appl. No.: 18/960,472

(22) Filed: Nov. 26, 2024

(65) Prior Publication Data

US 2025/0171144 A1 May 29, 2025

Related U.S. Application Data

(60) Provisional application No. 63/603,541, filed on Nov. 28, 2023.

(51) Int. Cl.
*B64D 1/02* (2006.01)
*A01K 11/00* (2006.01)
(Continued)

(52) U.S. Cl.
CPC ............. *B64D 1/02* (2013.01); *A01K 11/006* (2013.01); *B64U 10/13* (2023.01); *F16F 15/30* (2013.01);
(Continued)

(58) Field of Classification Search
CPC .. A01K 11/006; A01K 11/007; A01K 11/008; B64D 1/02; B64D 1/04;
(Continued)

(56) References Cited

U.S. PATENT DOCUMENTS 4,572,053 A * 2/1986 Sosnowski ........... H02K 41/025 89/1.51
8,196,866 B2 * 6/2012 Edelstein ................. B64D 1/06 294/82.26

(Continued)

FOREIGN PATENT DOCUMENTS

KR 2018069596 A * 6/2018

OTHER PUBLICATIONS

Baumgertner and Mate, "Summertime foraging ecology of North Atlantic right whales", Mar. Ecol. Prog. Ser. 264: 123-135, Dec. 15, 2003, Retrieved from: http://dx.doi.org/10.3354/meps264123.

(Continued)

*Primary Examiner* — Joshua E Rodden
(74) *Attorney, Agent, or Firm* — Knobbe, Martens, Olson & Bear, LLP

(57) ABSTRACT

A system for deploying a payload from an aerial vehicle onto a target surface includes a flywheel-stabilized delivery device that is detachably couplable to the aerial vehicle. The delivery device includes an axle, a flywheel, and a payload holder. The delivery device may additionally include an attachment portion and a floatation device. The payload holder may be detachably coupled to the payload such that the delivery device detaches from payload upon impact at the target surface. The system may additionally include a release mechanism for detachably coupling the delivery device to the aerial vehicle. The release mechanism may include a flywheel driver, a receiver, and a dropper device. The release mechanism may be remotely controlled by an operator to release the delivery device from the aerial vehicle.

20 Claims, 9 Drawing Sheets

(51) Int. Cl.
*B64U 10/13* (2023.01)
*F16F 15/30* (2006.01)
*B64U 101/35* (2023.01)

(52) U.S. Cl.
CPC ...... *B64U 2101/35* (2023.01); *B64U 2201/00* (2023.01)

(58) Field of Classification Search
CPC . B64D 1/08; B64D 1/12; B64U 10/13; B64U 2101/18; B64U 2101/35; B64U 2101/60; B64U 2101/64; B64U 2201/00; F16F 15/30; F16F 15/315; F16F 15/32; F16F 15/322; F16F 15/324
USPC ........................................................ 244/137.4
See application file for complete search history.

(56) References Cited

U.S. PATENT DOCUMENTS

| | | | | |
|---|---|---|---|---|
| 9,896,182 | B1 * | 2/2018 | Beckman | G05D 1/106 |
| 10,589,853 | B2 * | 3/2020 | Lee | B64U 40/10 |
| 11,719,504 | B1 * | 8/2023 | Kopman | F41B 11/54<br>124/78 |
| 12,259,210 | B1 * | 3/2025 | Dullea | A63B 69/406 |
| 2018/0135798 | A1 * | 5/2018 | Griffin | G05B 6/02 |
| 2020/0094962 | A1 * | 3/2020 | Sweeny | B64D 1/02 |
| 2020/0140078 | A1 * | 5/2020 | Lu | B64C 29/0025 |
| 2021/0271267 | A1 * | 9/2021 | Thomas | B64U 30/20 |
| 2022/0332404 | A1 * | 10/2022 | Johnson | B64U 20/87 |
| 2023/0113569 | A1 * | 4/2023 | Marcel | H02K 7/14<br>244/17.23 |
| 2023/0331384 | A1 * | 10/2023 | Parraga | B64C 39/024 |
| 2024/0034468 | A1 | 2/2024 | Zadra et al. | |
| 2024/0114821 | A1 * | 4/2024 | Thota | A01C 7/201 |
| 2025/0100681 | A1 * | 3/2025 | Seki | B64D 1/14 |

OTHER PUBLICATIONS

Blair et al., "Evidence for ship noise impacts on humpback whale foraging behaviour", Biol. Lett, 12, Jul. 12, 2016, Retrieved from: http://dx.doi.org/10.1098/rsbl.2016.0005.
Burgess, "Development of a Wideband Acoustic Recording Tag to Assess the Acoustic Behavior of Marine Wildlife", Technical Report GS0118A-1001, Jan. 2010, Retrieved from: https://www.researchgate.net/publication/235119411_Development_of_a_Wideband_Acoustic_Recording_Tag_to_Assess_the_Acoustic_Behavior_of_Marine_Wildlife.
Burgess, "The Acousonde: A miniature autonomous wideband recorder", J Acoust Soc Am 125, 2588, Apr. 8, 2009, Retrieved from: https://pubs.aip.org/asa/jasa/article/125/4_Supplement/2588/714663/The-Acousonde-A-miniature-autonomous-wideband.
Cade et al., "Kinematic Diversity in Rorqual Whale Feeding Mechanisms", Current Biology, vol. 26, Iss. 19, p. 2617-2624, Oct. 10, 2016, Retrieved from: https://linkinghub.elsevier.com/retrieve/pii/S0960982216307886.
Calambokedis et al., "Differential Vulnerability to Ship Strikes Between Day and Night for Blue, Fin, and Humpback Whales Based on Dive and Movement Data From Medium Duration Archival Tags", Front. Mar. Sci., Sec. Marine Conservation and Sustainability, vol. 6, Sep. 13, 2019, Retrieved from: http://dx.doi.org/10.3389/fmars.2019.00543.
Friedleander et al., "Diel changes in humpback whale *Megaptera novaeangliae* feeding behavior in response to sand lance *Ammodytes* spp. behavior and distribution", MEPS 395:91-100, Dec. 3, 2009, Retrieved from: https://www.int-res.com/abstracts/meps/v395/p91-100/.
Goldbogen and Madsen, "The largest of August Krogh animals: Physiology and biomechanics of the blue whale revisited," Comparative Biochemistry and Physiology Part A: Molecular & Integrative Physiology, vol. 254, Apr. 2021, Retrieved from https://www.sciencedirect.com/science/article/abs/pii/S1095643320302476.
Gough et al., "Scaling of swimming performance in baleen whales", Journal of Experimental Biology (2019) 222, Mar. 29, 2019, Retrieved from: http://dx.doi.org/10.1242/jeb.204172.
Hazen et al., "Blue whales (*Balaenoptera musculus*) optimize foraging efficiency by balancing oxygen use and energy gain as a function of prey density", Sci. Adv., Oct. 2, 2015, Retrieved from: http://dx.doi.org/10.1126/sciadv.1500469.
Holton et al., "Animal tag technology keeps coming of age: an engineering perspective", Phil. Trans. R. Soc. B, 376, Aug. 2021, Retrieved from: http://dx.doi.org/10.1098/rstb.2020.0229.
Kvadsheim et al., "Cetaceans and naval sonar—the 3S-2009 cruise report", FFI, Jul. 1, 2009, Retrieved from: https://publications.ffi.no/en/item/cetaceans-and-naval-sonar-the-3s-2009-cruise-report.
Linsky et al., "The scale of the whale: using video-tag data to evaluate sea-surface ice concentration from the perspective of individual Antarctic minke whales", Anim Biotelemetry (2020) 8:31, Oct. 12, 2020, Retrieved from: https://animalbiotelemetry.biomedcentral.com/articles/10.1186/s40317-020-00218-8.
McIntyre "Trends in tagging of marine mammals: a review of marine mammal biologging studies",African Journal of Marine Science, vol. 36, Iss. 4, Jul. 1, 2014, Retrieved from: https://www.tandfonline.com/doi/abs/10.2989/1814232X.2014.976655.
Miller et al. "Using at-sea experiments to study the effects of airguns on the foraging behavior of sperm whales in the Gulf of Mexico", Deep Sea Research Part 1: Oceanographic Research Papers, vol. 56, Iss 7, Jul. 2009, Retrieved from: https://linkinghub.elsevier.com/retrieve/pii/S0967063709000508.
Murakami et al. "Logger Attaching System for Sperm Whales Using a Drone", JRM,, vol. 33, No. 3, pp. 475-483, Jun. 20, 2021, Retrieved from: http://dx.doi.org/10.20965/jrm.2021.p0475.
Nowacek et al., "Buoyant balaenids: the ups and downs of buoyancy in right whales", Proc. R. Soc. Lond. B (2001) 268, 1811-1816, May 4, 2001; Retrieved from: https://www.ncbi.nlm.nih.gov/pmc/articles/PMC1088813/pdf/PB011811.pdf.
Oleson et al., "Behavioral context of call production by eastern North Pacific blue whales", MEPS 330:269-284, Jan. 25, 2007 Retrieved from: https://www.int-res.com/abstracts/meps/v330/p269-284/.
Parks et al., "Dangerous dining: surface foraging of North Atlantic right whales increases risk of vessel collisions", Aug. 3, 2011, Retrieved from: http://dx.doi.org/10.1098/rsbl.2011.0578.
Raoult et al., "Operational Protocols for the Use of Drones in Marine Animal Research", Drones 2020 4, 64, Retrieved from: https://www.mdpi.com/2504-446X/4/464.
Savoca et al., "Baleen whale prey consumption based on high-resolution foraging measurements", Nature vol. 599, pp. 85-90, Nov. 3, 2021, Retrieved from: http://dx.doi.org/10.1038/s41586-021-03991-5.
Segre et al. "Biomechanically distinct filter-feeding behaviors distinguish sei whales as a functional intermediate and ecologically flexible species", Journal of Experimental Biology (2021) 224, Mar. 24, 2021, Retrieved from: http://dx.doi.org/10.1242/jeb.238873.
Segre et al., "Energetic and physical limitations on the breaching performance of large whales", eLife, Jan. 29, 2020, Retrieved from: https://elifesciences.org/articles/51760.
Stimpert et al., "Sound production and associated behavior of tagged fin whales (*Balaenoptera physalus*) in the Southern California Bight", Animal Biotelemetry vol. 3, Article No. 23, Aug. 3, 2015, Retrieved from: http://dx.doi.org/10.1186/s40317-015-0058-3.
Tyack and Johnson, "A digital acoustic recording tag for measuring the response of wild marine mammals to sound", IEEE Journal of Oceanic Engineering, vol. 28, Iss. 1, Jan. 2003.
Ware et al., "Bottom side-roll feeding by humpback whales (*Megaptera novaeangliae*) in the southern Gulf of Maine, U.S.A", Jul. 24, 2013, Retrieved from: https://onlinelibrary.wiley.com/doi/10.1111/mms.12053.

(56) References Cited

OTHER PUBLICATIONS

Zhang et al., "Pose-gait analysis for cetacean biologging tag data", PLoS ONE 17(9), Dec. 7, 2021, Retrieved from: https://journals.plos.org/plosone/article?id=10.1371/journal.pone.0261800.

* cited by examiner

FLYWHEEL STABILIZED SYSTEM FOR DEPLOYING A FREE-FALLING PAYLOAD FROM AN AERIAL VEHICLE AND METHODS OF USE THEREOF

INCORPORATION BY REFERENCE TO ANY PRIORITY APPLICATIONS

This application claims the benefit of U.S. Provisional Patent Application No. 63/603,541, filed Nov. 28, 2023, which is incorporated by reference herein in its entirety.

BACKGROUND

Field of the Invention

The present disclosure relates generally to systems and methods for stabilizing a free-falling payload. More particularly, the present disclosure relates to systems and methods for stabilizing a biologging tag or other tracking device as it is dropped from an aerial vehicle onto a target, for example, a marine mammal.

Description of the Related Art

Biologging tags have become an important tool that can be used for studying free-swimming marine mammals around the world (McIntyre 2014, Raoult et al. 2020, Holton et al. 2021). Biologging tags have provided important and novel information relative to the behavioral ecology of large whales, often with the goal of mitigating anthropogenic interactions such as entanglement or ship strike (Parks et al. 2011, Calambokedis et al. 2019) or reaction to noise (Blair et al. 2016). To date, biologging tags have provided important information for humpback (*Megaptera novaeangliae*) (Friedleander et al. 2009, Parks et al. 2011, Ware et al. 2013), blue (*Balaenoptera musculus*) (Oleson et al. 2007; Hazen et al. 2015, Goldbogen and Madsen 2021), sperm (*Physeter macrocephalus*) (Miller 2009), sei (*Balaenoptera borealis*) (Segre et al. 2021), North Atlantic right (*Eubalaena: glacialis*) (Baumgertner and Mate 2003, Parks et al. 2011), fin (*Balaenoptera physalus*) (Stimpert et al. 2015), and minke (Linsky et al. 2020) whales. Biologging tags have also provided insights into swimming biomechanics (Gough et al. 2019, Zhang et al. 2021), particular behaviors such as breaching mechanics (Segre et al. 2020), and ecosystem function (Savoca et al. 2021).

A variety of biologging suction cup attached tags have been developed for large whales including DTAGs (Tyack and Johnson 2003), CATS tags (Cade et al. 2016), and Bioacoustic (B)-Probes (Burgess 2009, Burgess 2010). A common denominator for all these tags is a delivery method using a small boat to approach within meters of the whale, after which a pole is used to affix a tag to the animal (i.e., pole-tagging, see Nowacek et al. 2001; Friedleander et al. 2009 and Parks et al. 2011). An alternative method has been developed for using a pressurized pneumatic system to launch tags from up to 12 m using an ARTs system (Kvadsheim et al. 2009). The advantages of these approaches are that they have been successfully used in the past on a variety of species and a number of organizations have developed considerable infrastructure and expertise for their use. The disadvantages involve the need to closely approach animals with associated harassment possibilities (e.g., physical disturbance and/or noise) and the possibility of whales and/or people being injured. An additional disadvantage is the distance that the approach boat often needs to transit when a whale surfaces, which can require high speed to reach the whale before it dives and/or repeated repositioning of the boat in hopes that the whale will surface in the immediate vicinity. These methods usually require multiple approaches and considerable time to be successful, which can limit the number of animals tagged during a project.

Recently, aerial deployment of biologging tags from aerial vehicles has been investigated as a novel means for tagging whales and other wildlife. The first description of a UAV deployment of a biologging tag was published in 2021, describing a system for deployment of tags on sperm whales (Murakami et al. 2021). However, field testing of their system resulted in only two partial tag attachments out of eleven deployments. Furthermore, in both of those partial attachments, the partially attached tag prematurely peeled off from the body of the whale resulting in unsuccessful deployments. While there are many potential advantages of using aerial vehicles for tagging large whales, aerial vehicles have not been widely adopted for this purpose. The irregular shape, center of mass, and aerodynamic properties of many biologging tags present obstacles for their successful deployment from an aerial vehicle and attachment onto a marine mammal. For instance, many biologging tags experience undesirable pitching, rolling, spinning, and/or tumbling during freefall. As a result, biologging tags commonly impact the marine mammal in an orientation that is not conducive to tag attachment (e.g., with the suction cups not facing downwards). As a result, improved systems and methods for stabilizing and attaching free-falling biologging tags are needed. More generally, improved systems and methods for deploying a payload are needed.

SUMMARY

The systems, methods, and devices described herein have innovative aspects, no single one of which is indispensable or solely responsible for their desirable attributes. Without limiting the scope of the claims, some of the advantageous features will now be summarized.

The present disclosure includes systems and methods for deploying a payload from an aerial vehicle onto a target surface.

In one aspect, the present disclosure includes the use of a spinning object (e.g., a flywheel) to stabilize a free-falling payload. Although various-shaped wheel-like objects rotating about an axis can be used, for ease or reference these all will be referred to as a "flywheel" unless specifically indicated otherwise. A wheel-shaped flywheel is a preferred embodiment. One advantage of using a flywheel over other stabilization means is the ability to maintain proper orientation of the payload when it is dropped from a low elevation relative to the target surface. Other stabilization approaches, such as aerodynamic stabilization, require the payload to be dropped from a high elevation to allow the orientation of the payload to stabilize by reaching a sufficient velocity. Because it is not reliant on aerodynamic stabilization, a flywheel stabilized design can maintain orientation of the payload when it is dropped from within a few feet or less above the target surface. By lowering the required deployment elevation, a flywheel stabilized design allows the user to more accurately impact payloads onto target surfaces.

In another aspect, the present disclosure includes the use of unmanned aerial vehicles (UAVs) as a platform for tagging free-swimming whales. There are several potential advantages to using UAVs for tagging activities. First, the speed, maneuverability, and situational awareness of an UAV is vastly superior to that of traditional approach vessels. For example, many commercially available UAVs can quickly reach speeds in excess of 50 km/hr., meaning the approach boat and UAV operator can be hundreds of meters from a surfacing animal, and the UAV can be launched and positioned over the whale to attempt tag attachment on that same surfacing. In addition, the extreme maneuverability of the UAV and its constant birds-eye view means that, in optimal conditions, the UAV pilot can track the target whale when it is traveling subsurface between ventilations, thereby maintaining an optimal position for tagging at each surfacing. Therefore, the use of UAVs in tagging activities could (1) reduce the need to closely approach animals, (2) reduce the close-approach related vessel disturbance to which animals are subjected, (3) reduce the time and number of approaches needed to attach a tag, (4) reduce the potential of the vessel striking a whale during tag approaches, and (5) reduce the possibility of people being inadvertently injured by the whale during tagging operations.

Additionally, the use of UAVs, instead of traditional tagging methods, allows teams to increase the number of tagged animals and successful tag deployments in the same amount of time. By reducing the number of tagging attempts, the stress of the tagging process is greatly reduced for both the whales and the scientists. Incorporating the use of UAVs and advanced tagging systems enables researchers to study vulnerable or difficult to study species of whales, with minimal disruption to their habitats. Reducing disruptions to the whales' normal behaviors often yields more consistent and quality data. Furthermore, the maneuverability and efficiency of drone tagging methods can enable researchers to specifically target which whales they would like to tag, as the method does not rely as much on opportunity as previous tagging methods. For example, if researchers wanted to only tag calves, UAV tagging could enable the targeting of only the calves with minimal disruption to the whales. The combination of efficiency, precision, and minimal disruption may compound to greatly enhance the yield and quality of data collected during tagging activities.

Other tag attachment methods often use mechanisms that pierce the skin of the animal. However, the use of suction cups with the tags, instead of hooks, needles, or barbs, may reduce the stress and disruption on the target marine mammal. Suctions cups also allow the tags to automatically detach themselves after a period with no lasting damage. However, there is a need for a deployment system for delivering tags with suction cups to improve both data quality and quantity.

This disclosure provides, among other things, an apparatus and method for deploying a payload from an aerial vehicle onto a target surface.

In one aspect described herein, a system for deploying a payload from an aerial vehicle onto a target surface comprises a delivery device comprising an axle, a flywheel rotatable around the axle, wherein the flywheel is configured to rotate about an axis parallel to a fall direction of the payload, an attachment portion coupled to the axle and a payload holder coupled to the axle, wherein the payload holder is detachably couplable to the payload, wherein the payload holder is configured to detach from the payload in response to the delivery device impacting the target surface, and a release mechanism coupled to the aerial vehicle, the release mechanism comprising, a dropper mount configured to be coupled to the aerial vehicle, the dropper mount comprising a slot configured to receive the attachment portion of the delivery device, a dropper device coupled to the dropper mount, the dropper device comprising a swing arm moveable between a first position in which the attachment portion is secured in the slot by the swing arm and a second position in which the attachment portion is not secured in the slot by the swing arm, and a dropper motor configured to move the swing arm between the first position and the second position, and a flywheel driver coupled to the dropper mount, the flywheel driver comprising a drive gear configured to drive the flywheel and a flywheel motor configured to drive the drive gear.

In another aspect described herein, a system for deploying a payload from an aerial vehicle onto a target surface comprises a delivery device detachably couplable to the aerial vehicle, the delivery device comprising an axle, a flywheel rotatable around the axle, wherein the flywheel is configured to rotate about an axis parallel to a fall direction of the payload, and a payload holder coupled to the axle, wherein the payload holder is configured to be coupled to a payload.

In another aspect described herein, a release mechanism for releasing a delivery device from an aerial vehicle comprises a dropper mount configured to be coupled to the aerial vehicle, the dropper mount comprising a slot configured to receive the delivery device, a dropper device coupled to the dropper mount, the dropper device comprising, a swing arm moveable between a first position in which the delivery device is secured in the slot by the swing arm and a second position in which the delivery device is not secured in the slot by the swing arm, and a dropper motor configured to move the swing arm between the first position and the second position, and a flywheel driver coupled to the dropper mount, the flywheel driver comprising a drive gear configured to drive a flywheel, and a flywheel motor configured to drive the drive gear.

In another aspect described herein, a method for deploying a payload from an aerial vehicle onto a target surface comprises detachably coupling a delivery device to the aerial vehicle, wherein the payload is coupled to the delivery device, spinning up a flywheel coupled to the delivery device, positioning the aerial vehicle above the target surface, detaching the delivery device from the aerial vehicle, impacting the payload onto the target surface.

BRIEF DESCRIPTION OF THE DRAWINGS

The features and advantages of the methods and systems described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION

Figure 1:
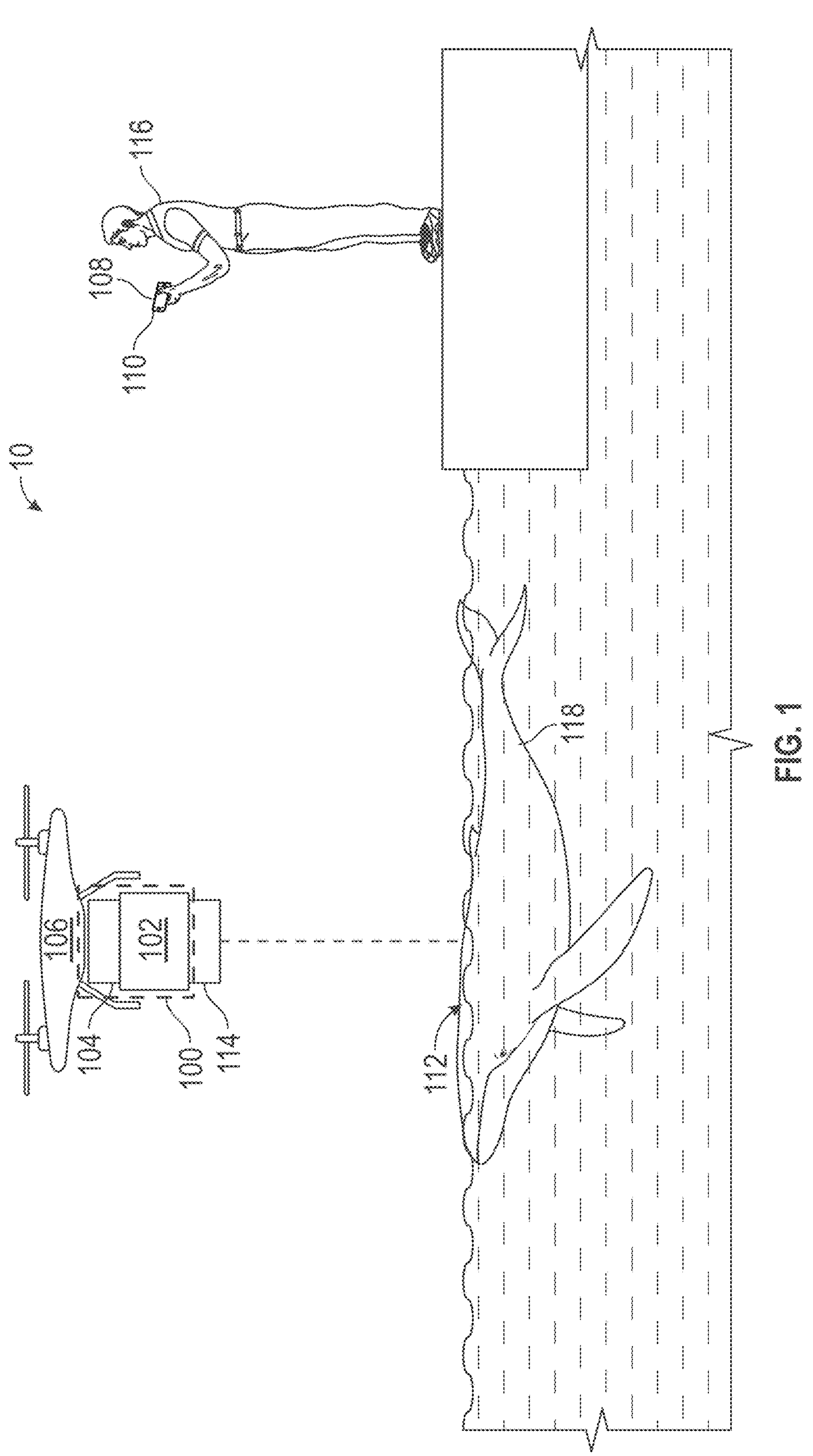
FIG. 1 depicts an example scenario in which a system for deploying a payload from an aerial vehicle onto a target surface may be utilized.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented, or a method may be practiced, using any number of the aspects set forth herein. In addition, such a system or device may be implemented, or such a method may be practiced, using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention. Descriptions of unnecessary parts or elements may be omitted for clarity and conciseness, and like reference numerals refer to like elements throughout.

As used herein, the term "aerial vehicle" refers to any aircraft, vehicle, object, device, or machine that is capable of flight. An aerial vehicle may take a variety of forms including, but not limited to, a rotorcraft such as a helicopter or multicopter, a fixed-wing aircraft, a jet aircraft, a ducted fan aircraft, a lighter than air dirigible such as a blimp or steerable balloon, a tail sitter aircraft, a glider aircraft, a paramotor, an unmanned aerial vehicle, or the like.

As used herein, the term "detachably coupled" or "detachably couplable" refers to a relationship between two or more components in which the components may be readily coupled to and uncoupled from one another. The coupling of components may be direct or indirect. Direct coupling refers to the coupling of a first component to a second component without any intermediary components between the first and second components. Indirect coupling refers to the coupling of a first component to a second component with one or more intermediary components between the first and second components. Components may be physically coupled to one another or electrically coupled to one another.

FIG. 1 depicts an example scenario 10 in which a system 100 for deploying a payload 114 from an aerial vehicle 106 onto a target surface 112 may be utilized. The system 100 for deploying a payload 114 from an aerial vehicle 106 onto a target surface 112 may comprise a delivery device 102 and/or a release mechanism 104. In the illustrated embodiment, a delivery device 102 can be detachably coupled to and carried by an aerial vehicle 106. The delivery device 102 can be coupled to the aerial vehicle 106 via a release mechanism 104 attached to the underside of the aerial vehicle 106. A payload 114 can be detachably coupled to the delivery device 102. In the illustrated embodiment, an operator 116 can use a controller 108 to maneuver and position the aerial vehicle 106 substantially above a target surface 112. Once the aerial vehicle 106 is substantially above the target surface 112, the operator 116 may use a transmitter 110 to transmit a signal to the release mechanism 104 instructing the release mechanism 104 to release the delivery device 102. After release, the delivery device 102 falls from the aerial vehicle 106 and impacts the target surface 112. In response to impacting the target surface 112, the delivery device 102 detaches from the payload 114. In some embodiments, the delivery device 102 may be recovered after impact and reused for additional payload 114 deployments.

More specifically, FIG. 1 depicts an example scenario 10 in which an embodiment may be used to attach a biologging tag onto a marine mammal 118. In the illustrated embodiment, the aerial vehicle 106 comprises an unmanned aerial vehicle (UAV). The terms "unmanned aerial vehicle" or "UAV" refer to any autonomous or semi-autonomous aerial vehicle that is capable of performing one or more flight-related functions without a physically present human pilot. Some functions may be controlled by a remote operator 116, while other functions may be performed autonomously. The terms "drone", "unmanned aerial vehicle system" ("UAVS"), or "uncrewed aerial system" ("UAS") may also be used to refer to a UAV. The UAV may be remotely controlled by an operator 116. In some embodiments, the operator 116 may be located on land, in a watercraft, or in another aerial vehicle 106. In some embodiments, the unmanned aerial vehicle may be a DJI MATRICE M210 V2 or DJI INSPIRE 2 equipped with a ZENMUSE X4S camera.

A target surface 112 may be any surface, object, location, region, area, or the like onto which a payload 114 is desired to be deployed, impacted, or delivered. In the illustrated embodiment, the target surface 112 is located on the exterior surface of a marine mammal 118, such as a whale. In other embodiments, the target surface 112 may be located on other types of animals, including but not limited to marine mammals or animals, for example, dolphins, manatees, and sharks; land animals including but not limited to giraffes, rhinos, and elephants; and semiaquatic animals including but not limited to crocodiles, hippos, and polar bears. Additionally, in other embodiments the target surface 112 may be located on inanimate objects, for example, moving inanimate object, movable inanimate objects, or stationary inanimate objects.

A payload 114 may be any cargo, package, device, machine, object, or the like that may be carried and released by an aerial vehicle 106. In the illustrated embodiment, the payload 114 comprises a biologging tag. A biologging tag is any device that may be used to detect, measure, or record biological or positional information corresponding to an animal. Biologging tags may comprise one or more suction cups for attachment to the animal. In some embodiments, the biologging tag may be a suction-cup equipped DTAGs (TYACK AND JOHNSON 2003) or CATS tags (CUSTOM ANIMAL TRACKING SOLUTIONS).

In the illustrated embodiment, the operator 116 can use a controller 108 to maneuver and position the UAV substantially above the marine mammal 118. Additionally, the operator 116 can use the controller 108 to operate the release mechanism 104 and delivery device 102. The UAV may comprise one or more imaging systems. For example, one or more still and/or video cameras may be utilized by the UAV to capture image data of the UAV's environment. The UAV may stream a video feed or a sequence of still images from the UAV's imaging system to a screen viewable by the operator 116. As the marine mammal 118 is swimming or moving, the operator 116 may utilize the live-feed video to maneuver the UAV to locate and follow the marine mammal 118. The operator 116 may use the transmitter 110 to transmit a signal to the release mechanism 104 to spin up the flywheel 208. As the operator 116 is maneuvering the UAV to be substantially above the marine mammal 118, the operator 116 may wait until the target surface 112 of the marine mammal 118 breaches above the water level. When the UAV is positioned substantially above the marine mammal 118 and the target surface 112 of the marine mammal 118 is above the water level, the operator 116 may use the transmitter 110 to transmit a signal to the release mechanism 104 to release the delivery device 102. Upon receipt of that signal at the release mechanism 104, the release mechanism 104 releases the delivery device 102, allowing the delivery device 102 to drop downwards toward the target surface 112 on the marine mammal 118. While in free-fall, the spinning flywheel 208 allows the delivery device 102 to assume an orientation in which the payload 114 is the leading portion of the delivery device 102. When the delivery device 102 falls in this orientation, the payload 114 is the first object to impact the target surface 112. If the payload 114 is a biologging tag with suction cups disposed on the bottom of the biologging tag, then the suction cups impact the target surface 112 of the marine mammal 118 and attach the biologging tag to the marine mammal 118. The delivery device 102 may detach from the payload 114 as a result of the change in momentum caused by the impact. After impact, the delivery device 102 may fall into the surrounding water or environment, while the biologging tag remains attached to the marine mammal 118.

Dimensions of device components may vary depending on the payload being deployed, the size of the animal, water conditions of the ocean, weather conditions during deployment, and many other factors playing into the process. The method and technique for successful deployment of the tag may vary as well due to the same factors.

For example, the delivery device 102 may be released from the aerial vehicle 106 at a height range (above a target surface) up to 4.5 m, 5.5 m, 6.5 m, 7.5 m, 8.5 m, or up to any other desired height. In some embodiments, the delivery device 102 may be released from a height under 1 m. In some embodiments using suction cup based biologging tags, the height may be higher so that the delivery device can sufficiently accelerate for the suction cups to couple to the target surface 112. In some embodiments, the payload 114 may be a DTAG. The delivery device 102 may be released from the aerial vehicle 106 at a distance of 2.5 m, 3.5 m, 4.5 m, or up to any other desired height. A heavier payload may impact the target surface 112 with enough force for the suction cups to couple the target surface 112 at lower heights. In some embodiments, the payload 114 may be a CATS tag.

In some embodiments, the distance between the site of deployment for the aerial vehicle 106 and the release of the delivery device 102 and/or the payload 114 can be about 90 m, 200 m, 300 m, 400 m, 500 m, 600 m, 700 m, 800 m, 900 m, 1000 m, 1048 m, or up to any desired distance.

Figure 2:
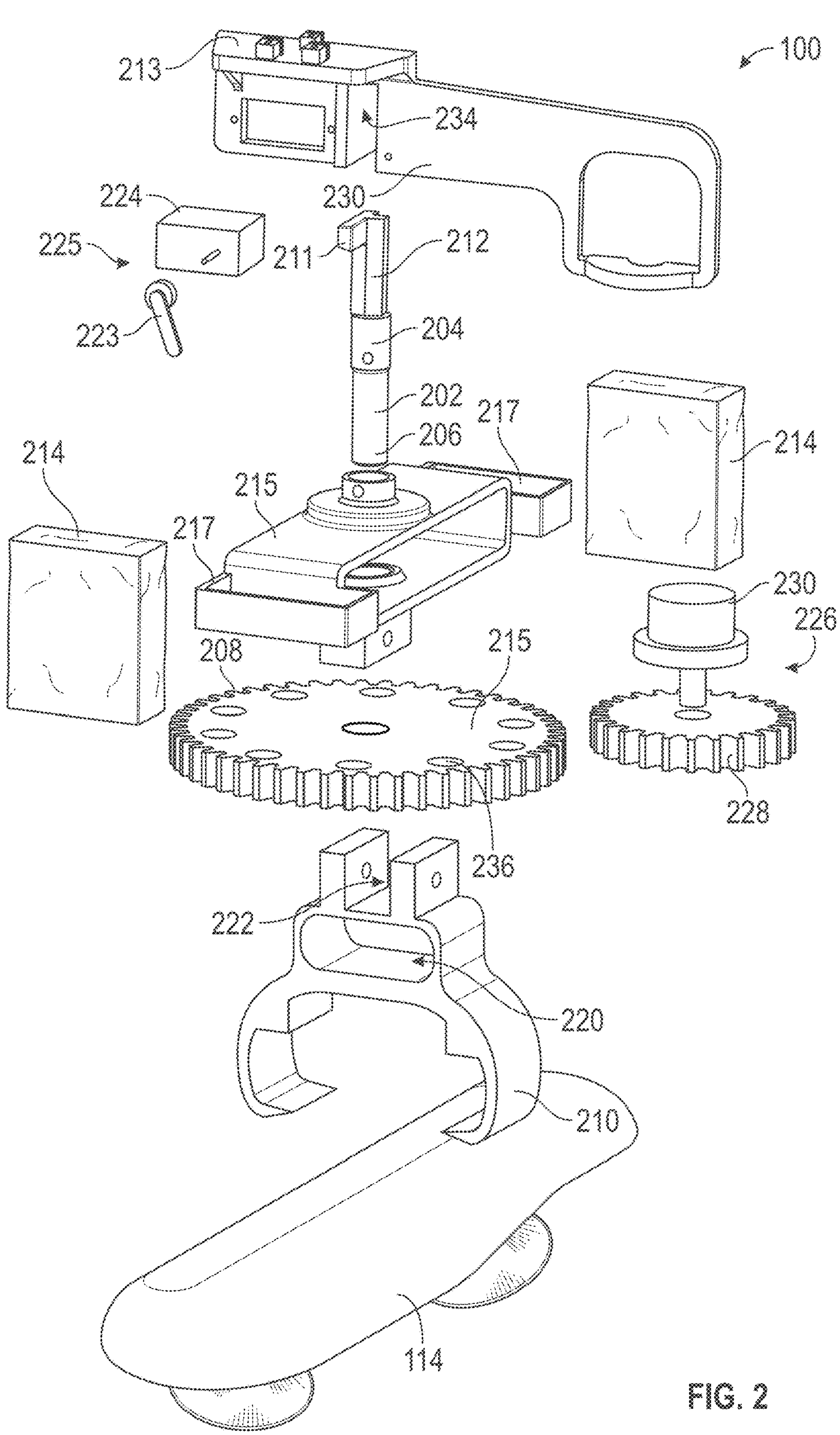
FIG. 2 depicts an exploded view of example components of an embodiment of a system for deploying a payload from an aerial vehicle onto a target surface.

FIG. 2 depicts an exploded view of example components of a system 100 for deploying a payload 114 from an aerial vehicle 106 onto a target surface 112. The system 100 can comprise a delivery device 102 and/or a release mechanism 104. The delivery device 101 can include an axle 202, a flywheel 208, an attachment portion 212, a payload holder 210, a flywheel bracket 215, and/or one or more floatation devices 214. The release mechanism 104 can include a dropper mount 213, a dropper device 225, a flywheel driver 226, and/or a slot 234.

Figure 3:
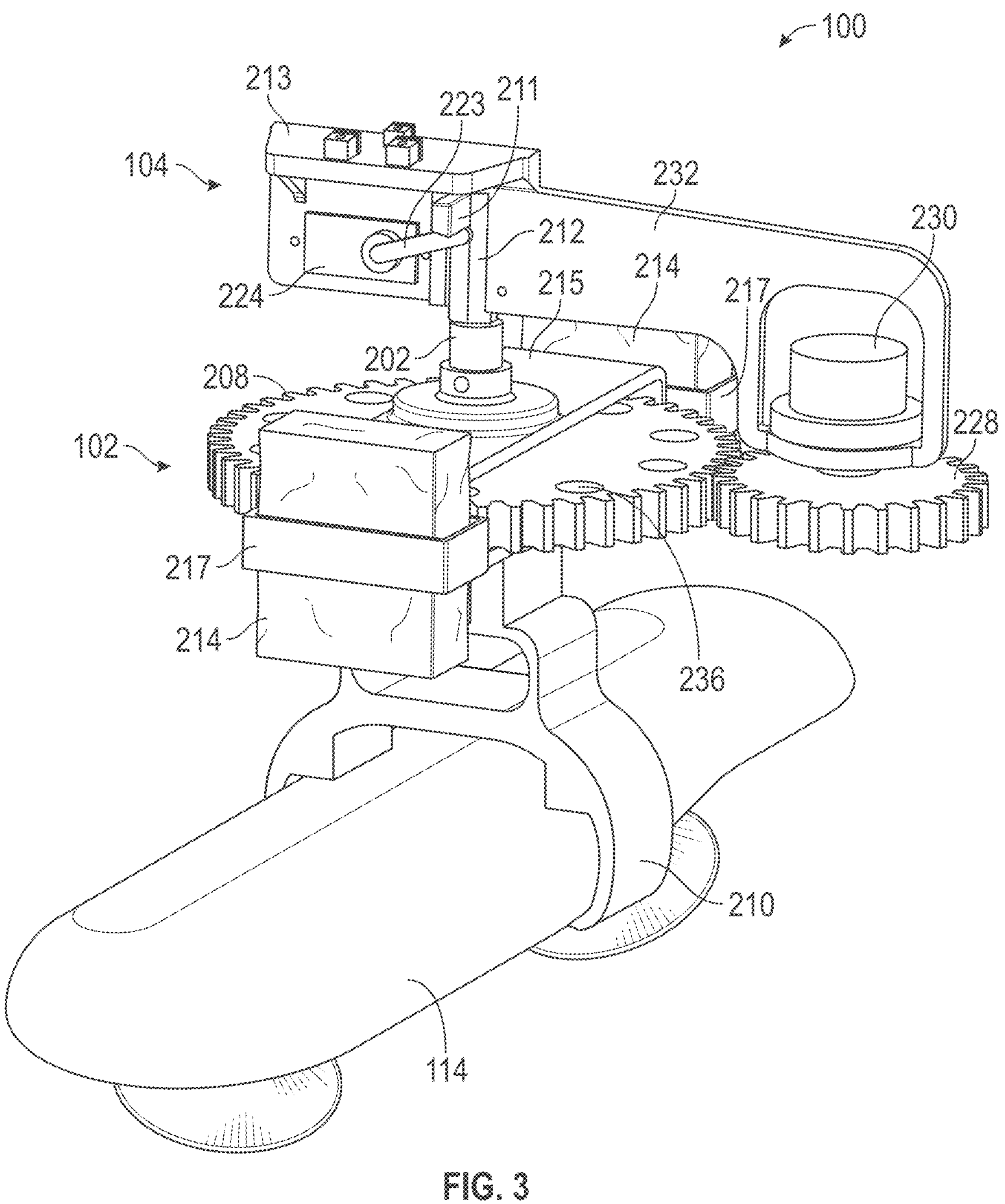
FIG. 3 depicts a perspective view of the system shown in FIG. 2.

FIG. 3 depicts a perspective view of the system 100 of FIG. 2 in an assembled state. As shown, the delivery device 102 can be detachably coupled to the release mechanism 104. Upon release from the release mechanism 104, the delivery device 102 can function to stabilize an orientation of the payload 114 during its free-fall from the aerial vehicle 106. For example, in the context of impacting a biologging tag onto the surface of a whale, the delivery device 102 may facilitate the impact of the biologging tag on the whale in a suction-cup down orientation. In that respect, the delivery device 102 may improve the flight characteristics of the payload 114 by reducing wobbling, pitching, rolling, spinning, and/or tumbling during freefall.

Figure 6:
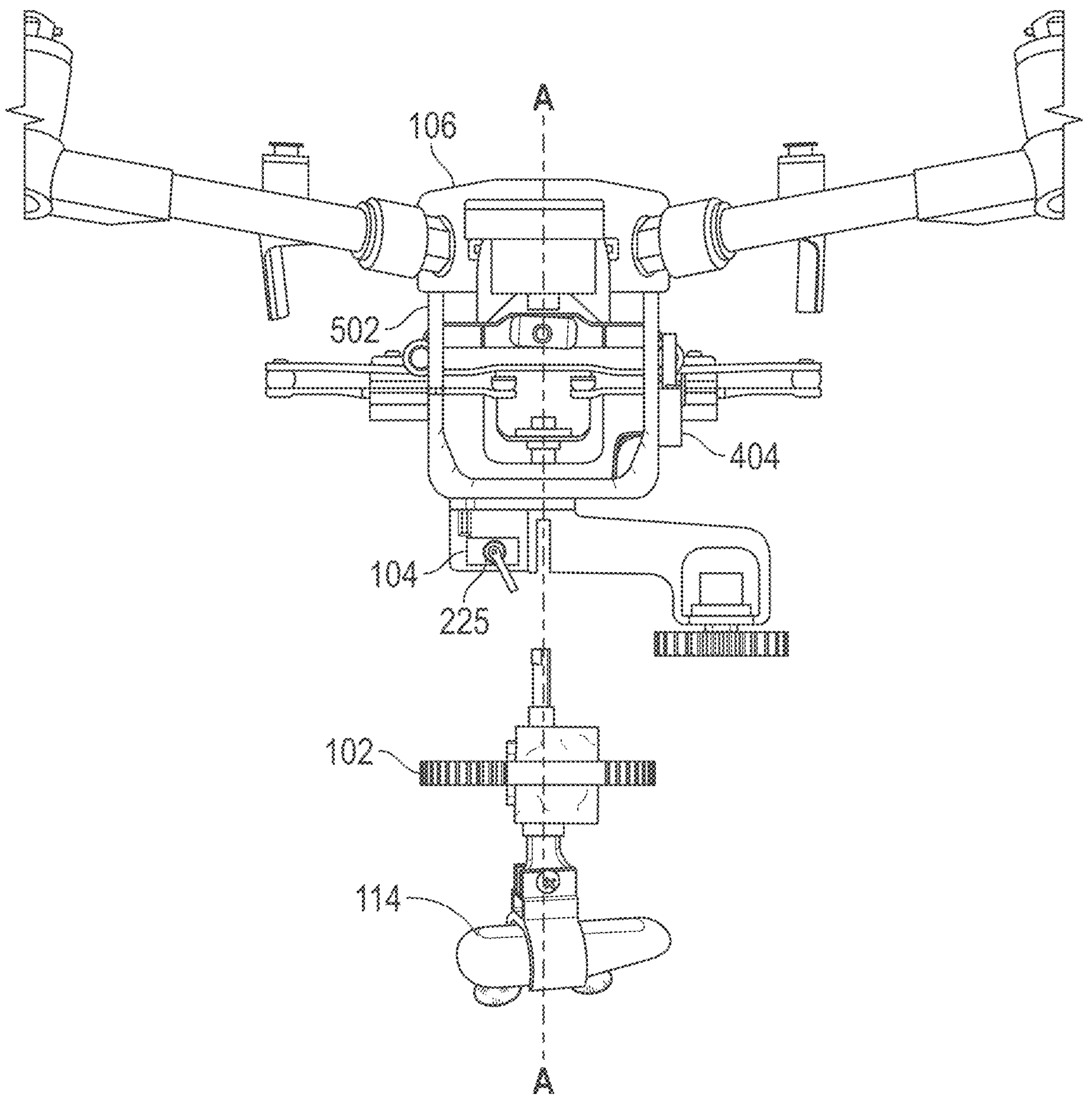
FIG. 6 depicts an example of a release mechanism coupled to an aerial vehicle after releasing a delivery device.

As shown in FIGS. 2-3, the delivery device 102 can include a flywheel 208 which may be spun up during operation of the system 100. The flywheel 208 may rotate about an axis that is substantially parallel to a fall direction of the payload 114. Specifically, as shown in FIG. 6 the flywheel 208 may rotate about a vertical axis A-A that is perpendicular to the surface of the earth. In operation, the flywheel 208 may be spun at a substantially constant rotational speed to provide the delivery device 102 with a large amount of stored angular momentum. As a result, any disturbance torques imparted on the delivery device 102 that are perpendicular to the flywheel's 208 axis of rotation (such as torques caused by wind or lateral movement of the aerial vehicle 106) do not directly result in angular rotation of the delivery device 102 about the same axis as the disturbance torque. Rather, the delivery device 102 experiences generally smaller angular rotations about an axis perpendicular to the disturbance toque. In effect, the flywheel 208 functions to stabilize the delivery device 102 to maintain on orientation during freefall in which the payload 114 is at the leading edge of the delivery device 102 and is the first portion of the delivery device 102 to impact the target surface.

The flywheel 208 may be any object rotatable around an axis. As shown in FIGS. 2-3, the flywheel 208 can be a circular gear. Specifically, the flywheel 208 may be a spur gear or other type of gear. In the illustrated embodiment, the flywheel 208 includes a central opening dimensioned to fit around the axle 202. The flywheel 208 can be configured to rotate around the around the axle 202. In some embodiments, a bearing, such as a ball bearing, may be coupled to the central opening to facilitate rotation of the flywheel 208 around the axle 202. In other embodiments, the flywheel 208 may be integrally connected to the axle 202 such that the axle 202 and the flywheel 208 rotate together. It is to be understood that the flywheel 208 can be any type of flywheel, such as a rimmed flywheel, a shaftless flywheel, a super flywheel, or the like. Additionally, the flywheel 208 can form a variety of different shapes, such as an annulus, a disk, a toothed gear, or the like.

The flywheel 208 can include a plurality of teeth. The flywheel 208 can have 50 teeth. In other embodiments, the flywheel 208 can have less than 50 teeth, more than 50 teeth, or any number of teeth. In other embodiments, the flywheel 208 may be a toothless gear. In some embodiments, the flywheel 208 may operate using mechanical friction, electromagnetic force, or any other system for driving a rotating object.

The mass of the flywheel 208 may be biased towards the outer circumference of the flywheel 208. For instance, as shown in FIGS. 2-3, the flywheel 208 can include flywheel weights 236 positioned radially around an outer portion of the flywheel 208. The flywheel 208 may comprise a plurality of slots for receiving the flywheel weights 236. Adding weights to the outer portion of the flywheel 208 can increase the amount of angular momentum generated by the flywheel 208. In other embodiments, such as for rimmed flywheels, the flywheel 208 may not include flywheel weights 236 and may instead be shaped such that a majority of the mass of the flywheel 208 is positioned at an outer edge of the flywheel 208.

Additionally, it is to be understood that the diameter, weight, and rotation speed of the flywheel 208 can be altered depending on the specific application. For instance, if a larger or heavier payload 114 is being deployed, then the diameter, weight, and/or rotation speed of the flywheel 208 can be increased to ensure the delivery device's 102 stabilization capabilities are maintained. A flywheel 208 with a greater diameter, weight, and/or rotation speed has a greater angular momentum, and thus greater resistance to disturbance torques.

For example, in some embodiments, the flywheel 208 can have a diameter of approximately 100 mm. In some embodiments, the diameter of the flywheel 208 may be approximately 100 mm, plus or minus about 20% (e.g., plus or minus 20 mm). In various embodiments, the diameter of the flywheel 208 may be between about 50 mm and 200 mm. In some embodiments, the diameter of the flywheel 208 may be any of, or between any two, of the following dimensions: 50 mm, 75 mm, 100 mm, 125 mm, 150 mm, 175 mm, and 200 mm. However, in various embodiments, the diameter of the flywheel 208 may be less than 50 mm or greater than 200 mm.

For example, in some embodiments, the flywheel 208 can have a mass of approximately 150 grams. In some embodiments, the mass of the flywheel 208 may be approximately 150 grams, plus or minus about 20% (e.g., plus or minus 30 grams). In various embodiments, the mass of the flywheel 208 may be between about 50 grams and 300 grams. In some embodiments, the mass of the flywheel 208 may be any of, or between any two, of the following dimensions: 50 grams, 75 grams, 100 grams, 125 grams, 150 grams, 175 grams, 200 grams, 225 grams, 250 grams, 275 grams, and 300 grams. However, in various embodiments, the mass of the flywheel 208 may be less than 50 grams or greater than 300 grams.

For example, in some embodiments, the flywheel 208 can spin at rate of approximately 1000 revolutions per minute (rpm). In some embodiments, the rotational speed of the flywheel 208 may be approximately 1000 rpm, plus or minus about 20% (e.g., plus or minus 200 rpm). In various embodiments, the rotational speed of the flywheel 208 may be between about 500 rpm and 2000 rpm. In some embodiments, the rotational speed of the flywheel 208 may be any of, or between any two, of the following dimensions: 500 rpm, 750 rpm, 1000 rpm, 1250 rpm, 1500 rpm, 1750 rpm, and 2000 rpm. However, in various embodiments, the rotational speed of the flywheel 208 may be less than 500 rpm or greater than 2000 rpm.

As shown in FIGS. 2-3, the delivery device 102 can include an axle 202. The axle 202 comprises a first end 204 and a second end 206. The first end 204 of the axle 202 may refer to the trailing end of the axle 202 when the delivery device 102 is in free-fall. In some embodiments, the first end 204 of the axle 202 refers to the end of the axle 202 that is located proximal to the aerial vehicle 106. The second end 206 of the axle 202 may refer to the leading end of the axle 202 when the delivery device 102 is in free-fall. In some embodiments, the second end 206 of the axle 202 refers to the end of the axle 202 that is located distal to the aerial vehicle 106. In the illustrated embodiment, the axle 202 forms a generally cylindrical shape, with a substantially circular cross section. In other embodiments, the axle 202 may form any other shape, such as a triangular prism, rectangular prism, or the like. Additionally, in other embodiments, the cross section may be any shape, such as a triangle, rectangle, or the like. The axle 202 provides a base about which the flywheel 208 may rotate. Additionally, the axle 202 can provide attachment points at the first end 204 and the second end 206 for coupling of an attachment portion 212 and/or payload holder 210 to the delivery device 102. The axle 202 can include an opening extending therethrough for attachment to a flywheel bracket 215.

The delivery device 102 may comprise an attachment portion 212. The attachment portion 212 serves as a coupling point between the delivery device 102 and the release mechanism 104. The attachment portion 212 may be connected to the first end 204 of the axle 202. As shown in FIGS. 2-3, the attachment portion 212 can extend from the first end 204 of the axle 202 along a longitudinal axis of the axle 202. The attachment portion 212 comprises a connection point configured to detachably couple to the release mechanism 104. The connection point can comprise a protrusion 211 extending from the attachment portion 212 in a direction perpendicular to the longitudinal axis of the axle 202. The attachment portion 212 is shaped to fit into a slot 234 of the release mechanism 104. The attachment portion 212 may have a substantially T-shaped cross-section configured to slide into a T-shaped slot 234 of the release mechanism 104. The attachment portion 212 may be coupled to the release mechanism 104 via a dropper device 225. A rotatable swing arm 223 may extend underneath the protrusion 211 to prevent the attachment portion 212 from sliding out of the slot 234. In some embodiments, the attachment portion 212 is specifically fitted to detachably couple to the dropper device 225 with tight tolerances to reduce payload 114 movement while in flight. The tight fitting of the attachment portion 212 to the dropper device 225 reduces the chance of tumbling and swaying when deploying the delivery device 102, therefore the accuracy and consistency of the drop improves.

The delivery device 102 can include a flywheel bracket 215. The flywheel bracket 215 can extend around opposing outer edges of the flywheel 208. The flywheel bracket 215 can include an opening shaped to receive the flywheel 208 and permit the flywheel 208 to rotate without obstruction. The flywheel bracket 215 may include a channel extending through an upper portion of the flywheel bracket 215. The channel may be shaped to receive the axle 202. An accompanying recessed slot may be formed in a lower portion of the flywheel bracket 215 for receiving the second end of the axle 202. The recessed slot may be coaxial with the channel. An annular protrusion may extend from the recessed slot for offsetting the flywheel 208 from a lower inner surface of the flywheel bracket 215. The flywheel bracket 215 may function to stabilize the axle 202 to prevent lateral movement of the axle 202 during operation of the delivery device 102. An attachment piece may extend from an upper exterior surface of the flywheel bracket 215. The attachment piece may form a portion of the channel. The attachment piece may include an opening therethrough for securing the axle 202 to the flywheel bracket 215 via a screw, bolt, pin, or any other suitable attachment means. A flattened portion may extend from an outer surface of the lower portion of the flywheel bracket 215. The flattened portion may be dimensioned to couple to the payload holder 210. The payload holder 210 may be coupled to the flattened portion via a screw, bolt, pin, or any other suitable attachment means. The flattened portion may be dimensioned for insertion into an attachment slot 222 formed in the payload holder 210.

As shown in FIGS. 2-3, the delivery device 102 may additionally comprise a payload holder 210. The payload holder 210 may be coupled to the delivery device 102 via the flattened portion of the flywheel bracket 215. In other embodiments, the payload holder 210 may be coupled directly to the second end of the axle 202. In the illustrated embodiment, the payload holder 210 comprises a pair of arms 216 configured to wrap around the payload 114. The pair of arms 216 are substantially arcuate in shape. A rectangular slot is formed within each arm 216 and is dimensioned to receive the payload 114. The shape, size, dimensions, and material of the arms 216 and slots may be changed to accommodate different payloads 114. A payload 114 may be inserted into the slots and held between the pair of arms 216. The payload holder 210 may exert a compressive force on the payload 114, resulting in a secure coupling. In other embodiments, the payload holder 210 may comprise any structure sufficient to securely hold a payload 114.

FIG. 3 depicts the payload holder 210 detachably coupled to the payload 114. In the illustrated embodiment, the payload 114 is a biologging tag. The biologging tag is disposed between the pair of arms 216, resulting in a secure coupling of the biologging tag to the delivery device 102. The coupling of the payload 114 to the delivery device 102 may be secure enough to prevent detachment during flight but loose enough to ensure detachment after impact on the target surface 112. The payload holder 210 can be configured to detach from the payload 114 in response to the delivery device 102 impacting the target surface 112. Upon impact, the resulting forces translated into the delivery device 102 cause the payload holder 210 to dislodge and detach from the payload 114. Accordingly, in order to allow for reuse of the delivery device 102, the payload holder 210 may be composed of a material with a sufficient elasticity to allow for detachment from the payload 114 without incurring breakage or cracking. In other embodiments, the payload holder 210 may be a single use component that is configured to break apart upon impact or remain attached to the payload 114. Various embodiments can have different heights for the payload holder 210, and different widths for the payload holder 210 as described in examples below.

For example, in some embodiments, the payload holder 210 can have a height of approximately 2.42 inches. In some embodiments, the height of the payload holder 210 may be approximately 2.42 inches, plus or minus about 20% (e.g., plus or minus 0.48 inches). In various embodiments height of the payload holder 210 may be between about 2 and 5 inches. In some embodiments, the height of the payload holder 210 may be any of, or between any two, of the following dimensions: 2.0 inches, 2.5 inches, 3.0 inches, 3.5 inches, 4.0 inches, 4.5 inches, and 5.0 inches. However, in various embodiments, the height of the payload holder 210 may be less than 2.0 inches or greater than 5 inches.

For example, in some embodiments, the payload holder 210 can have a width of approximately 2.85 inches. In some embodiments, the width of the payload holder 210 may be approximately 2.85 inches, plus or minus about 20% (e.g., plus or minus 0.57 inches). In various embodiments width of the payload holder 210 may be between about 2 and 5 inches. In some embodiments, the width of the payload holder 210 may be any of, or between any two, of the following dimensions: 2.0 inches, 2.5 inches, 3.0 inches, 3.5 inches, 4.0 inches, 4.5 inches, and 5.0 inches. However, in various embodiments, the width of the payload holder 210 may be less than 2.0 inches or greater than 5 inches.

In some embodiments, the payload holder 210 may comprise a weight 218. Inclusion of a weight 218 in the payload holder 210 moves the center of mass of the delivery device 102 to a location proximal to the payload 114. The increased mass at the distal end 206 of the delivery device 102 typically causes the payload 114 to make initial contact with the target surface 112. The weight 218 may be disposed inside of a compartment 220 formed in the payload holder 210. In the illustrated embodiment, the payload holder 210 comprises a compartment 220 formed in the body of the payload holder 210. In the illustrated embodiment, the compartment 220 containing a weight 218 is disposed between the pair of arms 216 and the attachment slot 222. In other embodiments, the weight 218 may be coupled to the exterior of the payload holder 210. Alternatively, the payload holder 210 itself may be comprised of a heavier material relative to the rest of the delivery device 102. In some embodiments, a weight 218 may be omitted. Various embodiments can have different weights of weight 218 as described in examples below.

For example, in some embodiments, the weight 218 is approximately 4 oz. In some embodiments, the weight 218 may weigh approximately 4 oz plus or minus 20% (e.g., plus or minus 0.8 oz). In some embodiments, the weight 218 may have a weight between about 2 and 8 oz. In various embodiments, the weight 218 has a weight of, or between any two, of the following weights: 2.0 oz, 2.5 oz, 3.0 oz, 3.5 oz, 4.0 oz, 4.5 oz, 5.0 oz, 5.5 oz, 6.0 oz, 6.5 oz, 7.0 oz, 7.5 oz, and 8.0 oz. However, in some embodiments, a weight 218 that weighs less than 2.0 oz or greater than 8.0 oz may be used.

As shown in FIGS. 2-3, one or more floatation brackets 217 may be affixed to the delivery device 102. Flotation brackets 217 can function to secure floatation devices 214 to the delivery device 102. In the illustrated embodiment, two floatation brackets 217 are coupled to opposing sides of the flywheel bracket 215. In some embodiments, one or more floatation brackets 217 can alternatively or additionally be coupled to the payload holder 210. For example, two floatation brackets 217 can extend from opposing sides of the payload holder 210 (see FIG. 8). In other embodiments, zero, one, two, or more floatation brackets 217 may be coupled to the delivery device 102 at any suitable location. The floatation brackets 217 may comprise an opening for receiving a floatation device 214. The floatation device 214 may be coupled to the floatation bracket 217 via straps, adhesive, screws, or any other suitable fastening means.

As shown in FIGS. 2-3, the delivery device 102 may include one or more floatation devices 214. In the illustrated embodiment, a floatation device 214 is coupled to each floatation bracket 217 on opposing sides of the flywheel bracket 215. This specific arrangement ensures that any added torque to one side of the delivery device 102 caused by air resistance of the floatation devices 214 is counteracted by an opposite torque caused by air resistance of the floatation device 214 on the opposite side of the delivery device 102. Regarding the scenario 10 in which a delivery device 102 is deployed above or near a body of water or other liquid, inclusion of a floatation device 214 ensures that the delivery device 102 will float on the surface of that liquid. Additionally, a floatation device 214 may improve an operator's 116 ability to find and recover the delivery device 102 after deployment from an aerial vehicle 106. In the illustrated embodiment, the floatation device 214 is a piece of foam material. In other embodiments, the floatation device 214 may be any material or device that causes the delivery device 102 to be neutrally or positively buoyant. In the illustrated embodiment, the floatation device 214 is a separate component that is coupled to delivery device 102. In other embodiments, the floatation device 214 may be integral to the delivery device 102, or the delivery device 102 itself may be comprised of a material sufficient for neutral or positive buoyancy. In some embodiments, the floatation device 214 may be a buoy, an inflatable device, or the like. In other embodiments, the delivery device 102 may not include a floatation device 214. The floatation device 214 may be loosely coupled to the delivery device 102 via a chain, rope, string, or the like, such that the floatation device 214 acts as a drogue when the delivery device 102 is in free-fall. Additionally, in other embodiments, the floatation device 214 may be coupled to any portion of the delivery device 102.

In some embodiments, one or more of the axle 202, flywheel 208, payload holder 210, flywheel bracket 215, floatation bracket 217, and/or attachment portion 212 may be structurally integral portions of the delivery device 102 that can be manufactured as a single structure. In other embodiments, one or more of the axle 202, flywheel 208, payload holder 210, flywheel bracket 215, floatation bracket 217, and/or attachment portion 212 may be separate components that are manufactured separately and fastened together to form the delivery device 102. Regarding embodiments in which one or more of the axle 202, flywheel 208, payload holder 210, flywheel bracket 215, floatation bracket 217, and/or attachment portion 212 are separate components, the separate components may be fastened together by mechanical friction, adhesives, mechanical fasteners, or any other means of fastening. For example, in the illustrated embodiment of FIGS. 2-3 the axle 202 and attachment portion 212 are manufactured together as a single integral component, whereas the payload holder 210, flywheel 208, and flywheel bracket 215 are each separately manufactured components that must be affixed together.

In some embodiments, the axle 202, flywheel 208, payload holder 210, flywheel bracket 215, floatation bracket 217, and/or attachment portion 212 can be 3-D printed components made from a plastic or other similar material. In other embodiments, the axle 202, flywheel 208, payload holder 210, flywheel bracket 215, floatation bracket 217, and/or attachment portion 212 may be made from any suitable material such as rubber, plastic, metal, ceramic, polymers, wood, fabric, or the like. Additionally, in other embodiments, the axle 202, flywheel 208, payload holder 210, flywheel bracket 215, floatation bracket 217, and/or attachment portion 212 may be manufactured using any suitable manufacturing method such as molding, casting, machining, carving, or the like.

As shown in FIGS. 2-3, the system 100 can include a release mechanism 104. The release mechanism 104 can be attached to an aerial vehicle 106 to facilitate the controllable release of the delivery device 102 from the aerial vehicle 106. The release mechanism 104 may provide an attachment point for detachably coupling the delivery device 102 to the aerial vehicle 106. The release mechanism 104 can include a dropper device 225, a flywheel driver 226, a dropper mount 213, a slot 234, a wireless receiver 404, and/or a power source 406.

As shown in FIGS. 2-3, the dropper mount 213 can comprise a frame structure for affixing the dropper device 225 and/or flywheel driver 226 to. Specifically, the dropper motor 224, swing arm 223, flywheel motor 230, and/or driver gear can be coupled to the dropper mount 213. The dropper mount 213 provides a structure for facilitating operation of the dropper device 225. The dropper mount 213 can comprise two substantially planar portions affixed together at a substantially ninety-degree angle. The top portion of the dropper mount 213 may extend along a plane that is substantially perpendicular to an axis of rotation of the flywheel 208. The bottom portion of the dropper mount 213 may extend along a plane that is substantially parallel to an axis of rotation of the flywheel 208. A substantially ninety-degree angle can be formed between the top portion and the bottom portion of the dropper mount 213. In other embodiments, the angle between the top portion and bottom portion may be less than or greater than ninety degrees. The bottom portion of the dropper mount 213 can include an elongated portion 232 extending outward towards an outer diameter or edge of the flywheel 208. The elongated portion 232 may extend beyond an outer edge of the flywheel 208. The elongated portion 232 may be dimensioned to receive and couple to the flywheel driver 226. The distal end of the elongated portion 232 can include a housing configured to receive the flywheel driver 226. The housing can include an opening configured to receive the flywheel motor 230. Multiple channels can be formed in the top portion of the dropper mount 213 for attachment to the mounting bracket 502 via screws, bolts, pins, or any other suitable fastening means. The bottom portion of the dropper mount 213 can include a rectangular opening for receiving the dropper motor 224 and swing arm 223. The bottom portion of the dropper mount 213 can include a slot 234 configured to receive the delivery device 102. Specifically, the slot 234 may be dimensioned to receive the attachment portion 212 of the delivery device 102. The cross-section of the slot 234 may be substantially T-shaped to accommodate a substantially T-shaped attachment portion 212. A portion of the slot 234 may extend into the elongated portion 232, such that the slot 234 includes a cavity in the elongated portion 232.

The dropper device 225 can include a dropper motor 224 and a swing arm 223. The dropper device 225 can be configured to securely hold and release the delivery device 102. The dropper motor 224 can be any suitable motor, such as a DC motor. The dropper motor 224 can be powered by an external power source or by the aerial vehicle's 106 onboard power source. The swing arm 223 can be coupled to the dropper motor 224. The swing arm 223 is coupled to the dropper motor 224 at a pivot point. The swing arm 223 comprises an elongated portion extending from the pivot point. The swing arm 223 can be dimensioned to extend past the slot 234 in the dropper mount 213. The dropper motor 224 can be configured to rotate the swing arm 223 between a first position in which the delivery device 102 can be securely coupled to the release mechanism 104 and a second position in which the delivery device 102 is not securely coupled to the release mechanism 104. Specifically, when the swing arm 223 is in the first position, the swing arm 223 can be in a substantially horizontal position such that the swing arm 223 extends across the slot 234 and obstructs the slot 234, thereby preventing the attachment portion 212 from sliding out of the slot 234. The second position can refer to when the swing arm 223 is in a position in which the swing arm 223 does not obstruct the slot 234 and the attachment portion 212 can be slid into and out of the slot 234. For instance, the swing arm 223 may be in the second position when it is angled substantially downwards, when it is angled substantially upwards, when is it positioned horizontally in a direction away from the slot 234, or when it is positioned in any intermediate position between the three aforementioned positions so long as the slot 234 is not obstructed. In operation, a user may position the swing arm 223 to the second position to allow the attachment portion 212 of the delivery device 102 to be inserted into the slot 234 on the dropper mount 213. After the attachment portion 212 is inserted into the slot 234, the swing arm 223 can be moved to the horizontal first position to securely coupled the delivery device 102 to the release mechanism 104. In this position, the swing arm 223 extends under a protrusion 211 of the attachment portion 212, thereby locking the delivery device 102 into the slot 234. When in the first position, the delivery device 102 is unable to be pulled out of the slot 234. When in the first position, the delivery device 102 can be securely coupled to the release mechanism 104 such that the delivery device 102 does not unintentionally detach from the aerial vehicle 106 during flight or movement of the aerial vehicle 106. When the delivery device 102 is desired to be released or removed from the release mechanism 104, the motor may be used to move the swing arm 223 to the second position. When in the second position, the swing arm 223 no longer obstructs the attachment portion 212, and the delivery device 102 can slide out of the slot 234 due to the downward pull of gravity on the delivery device 102.

In other embodiments, the dropper device 225 may be any mechanism or structure capable of holding and releasing a delivery device 102. In other embodiments, the dropper device 225 may include a suction system, a magnet system, a retractable shelf system, a mechanical arm or claw system, a latch system, a servo dropper system, or the like. The dropper device 225 may include one or more logic modules implemented via hardware, software, and/or firmware that cause the dropper device 225 to function as described herein. In some embodiments, the aerial vehicle 106 may include one or more logic modules that communicate with the dropper device 225 to cause the dropper device 225 to perform functions described herein.

As shown in FIGS. 2-3, the flywheel driver 226 can include a flywheel motor 230 and a drive gear 228. The flywheel driver 226 can be configured to drive the flywheel 208 to a sufficient rotational speed. The flywheel driver 226 may be coupled to a distal end of the elongated portion 232 of the dropper mount 213. The flywheel motor 230 may be any suitable motor, such as a DC motor. The flywheel motor 230 can be powered by an external power source or by the aerial vehicle's 106 onboard power source. The flywheel motor 230 can be configured to drive the drive gear 228. The drive gear 228 can be configured to rotate about an axis parallel to the axis of rotation of the flywheel 208. In other embodiments, the drive gear 228 may rotate about any other axis. The drive gear 228 may be any suitable type of gear, such as a spur gear or the like. The drive gear 228 can include a plurality of teeth. The drive gear 228 can have 25 teeth. In other embodiments, the drive gear 228 can have less than 25 teeth, more than 25 teeth, or any number of teeth. In other embodiments, the drive gear 228 may be a toothless gear. In some embodiments, the drive gear 228 may operate using mechanical friction, electromagnetic force, or any other means for driving a rotating object.

As shown in FIGS. 2-3, the drive gear 228 can be configured to interlock with teeth of the flywheel 208. The drive gear 228 can be configured to drive the flywheel 208 by transferring rotational motion to the flywheel 208. The gear ratio between the drive gear 228 and the flywheel 208 can be 0.5, meaning the drive gear 228 has half as many teeth as the flywheel 208 (25/50). In other embodiments, the gear ratio can be less than 0.5, more than 0.5, or any other value.

In some embodiments, the drive gear 228 can have a diameter of approximately 50 mm. In some embodiments, the diameter of the drive gear 228 may be approximately 50 mm, plus or minus about 20% (e.g., plus or minus 10 mm). In various embodiments, the diameter of the drive gear 228 may be between about 25 mm and 100 mm. In some embodiments, the diameter of the drive gear 228 may be any of, or between any two, of the following dimensions: 25 mm, 37.5 mm, 50 mm, 62.5 mm, 75 mm, 87.5 mm, and 100 mm. However, in various embodiments, the diameter of the drive gear 228 may be less than 25 mm or greater than 100 mm.

In operation, the delivery device 102 is dropped from the aerial vehicle 106 onto a target surface 112. While in freefall, the spinning flywheel 208 causes the biologging tag to maintain proper orientation and impact the target surface 112 first. In the illustrated embodiment, the suction cups disposed on the underside of the biologging tag attach to the target surface 112. In the case of a marine mammal 118, the biologging tag may be attached to the posterior side of the marine mammal 118. The delivery device 102 may facilitate the impact of the biologging tag on the whale in a suction-cup down orientation. In that respect, the delivery device 102 may improve the flight characteristics of the payload 114 by reducing wobbling, pitching, rolling, spinning, and/or tumbling during freefall. The delivery device 102 may also allow the payload 114 to impact the target surface 112 with a force sufficient for attachment. The delivery device 102 may be dropped from a sufficient height to allow the suction cups to attach to the marine mammal 118. Depending on the weight of the payload 114, the delivery device 102 may need to be released at varying heights. In some embodiments, the payload 114 may need to achieve a sufficient impact velocity to impact the target surface 112 with a sufficient force to attach to the target surface 112 and/or detach from the delivery device 102. If a heavier payload 114 is being deployed, the delivery device 102 may be released from a lower height than if a lighter delivery device 102 is being deployed. The operator 116 of the aerial vehicle 106 may maneuver the aerial vehicle 106 to a height corresponding to the desired impact velocity.

At the time of delivery device 102 deployment, the aerial vehicle 106 may be positioned at a location substantially above the target surface 112 such that the payload 114 successfully impacts the target surface 112 after being dropped. The position of the aerial vehicle 106 at the time of deployment of the delivery device 102 may be adjusted based on environmental factors such as weather, precipitation, wind velocity, velocity of the target surface 112, and the like. The position of the aerial vehicle 106 at the time of deployment of the delivery device 102 may also be adjusted based on the speed of the aerial vehicle 106. For example, the aerial vehicle 106 may lead in front of the target surface 112 or lag behind the target surface 112 in order to counteract the effects of wind on the drop trajectory of the delivery device 102.

Figure 4:
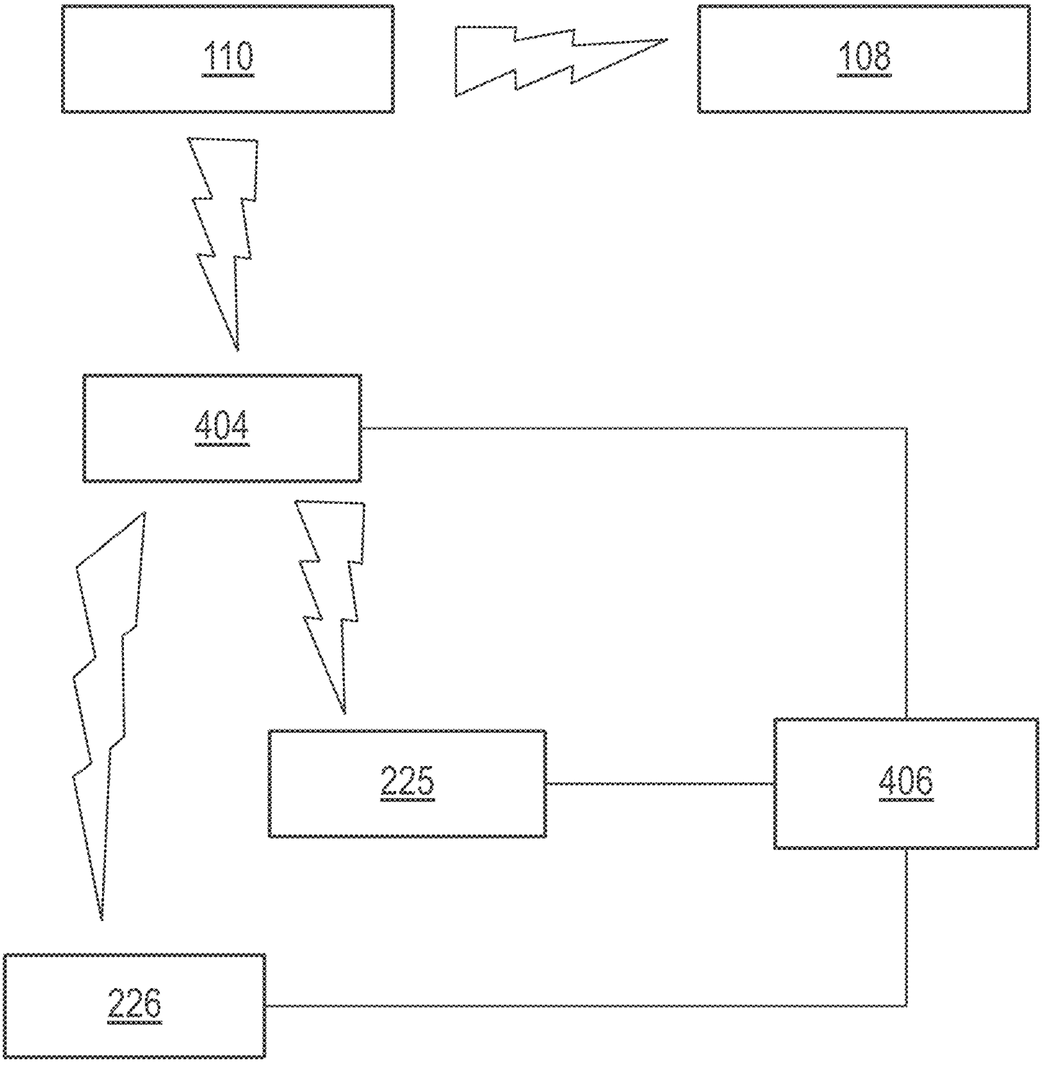
FIG. 4 depicts an example of a system for operating a release mechanism as part of a delivery system on a UAV.

FIG. 4 depicts a system for operating a release mechanism 104 as part of a delivery system on a UAV. In the illustrated embodiment, the dropper device 225, flywheel driver 226, wireless receiver 404, and power source 406 are electrically coupled to one another via wires. The power source 406 may be any energy source that can be electrically coupled to the release mechanism 104. The power source 406 provides an energy source for the wireless receiver 404, the dropper device 225, and the flywheel driver 226. In the illustrated embodiment, the power source 406 is independent from the aerial vehicle 106. In other embodiments, the release mechanism 104 may utilize the aerial vehicle's 106 onboard battery or energy source. The power source 406 may any source of power, such as a battery.

The wireless receiver 404 may be any receiver or transceiver capable of communicating via radio waves or other electromagnetic frequencies. The wireless receiver 404 may receive signals from a transmitter 110 via short range radio communications, such as Wi-Fi® or Bluetooth®, or via long range radio communications such as cellular frequencies. In the illustrated embodiment, the wireless receiver 404 is independent of the wireless communication interfaces contained within the aerial vehicle 106. In other embodiments, the release mechanism 104 may utilize the aerial vehicle's 106 onboard wireless receiver 404 or wireless communication interface. In the illustrated embodiment, the wireless receiver 404 is configured to receive signals transmitted by a transmitter 110.

The transmitter 110 may be any device capable of sending communications via radio waves or other electromagnetic frequencies. The transmitter 110 may be controlled by a human operator 116. In some embodiments, the transmitter 110 may be integrated into or electronically coupled with a controller 108. The controller 108 may be used to maneuver the aerial vehicle 106. The transmitter 110 may be integrated into the controller 108 via one or more switches located on the controller 108. Toggling a first switch may allow the operator 116 to activate or deactivate the release mechanism 104. Toggling a second switch may allow the operator to spin up or spin down the flywheel 208. The transmitter may also be able to send a signal to the wireless receiver instructing the flywheel driver 226 to operate the flywheel 208 at a certain rotational speed, for instance 1000 rpm. In some embodiments, the transmitter 110 is electrically coupled to and included within the controller 108. In other embodiments, the transmitter 110 and controller 108 may be separate. Integration of the transmitter 110 into the controller 108 allows for a single operator 116 to fly the aerial vehicle 106 and activate the release mechanism 104 and/or flywheel driver 226 on demand. This embodiment may eliminate lag time caused by the need for communication between the pilot of the aerial vehicle 106 and a dedicated operator 116 for the release mechanism 104 and/or flywheel driver 226. In the scenario 10 in which the target surface 112 is located on a marine mammal 118, such as a whale or dolphin, having a single operator 116 control the transmitter 110 and controller 108 also reduces the chance of dangerous/harmful events such as dropping the tag on sensitive areas of the marine mammal 118 (e.g., eyes or blowhole) due to miscommunication.

Communications between the transmitter and wireless receiver may occur via one or more networks. Wireless communications may occur under one or more wireless communication protocols, such as Bluetooth®, WiFi® (e.g., an IEEE 802.11 protocol), Long-Term Evolution® (LTE), WiMAX® (e.g., an IEEE 802. 16 standard), a radio frequency ID (RFID) protocol, near-field communication (NFC), and/or other wireless communication protocols.

Figure 5:
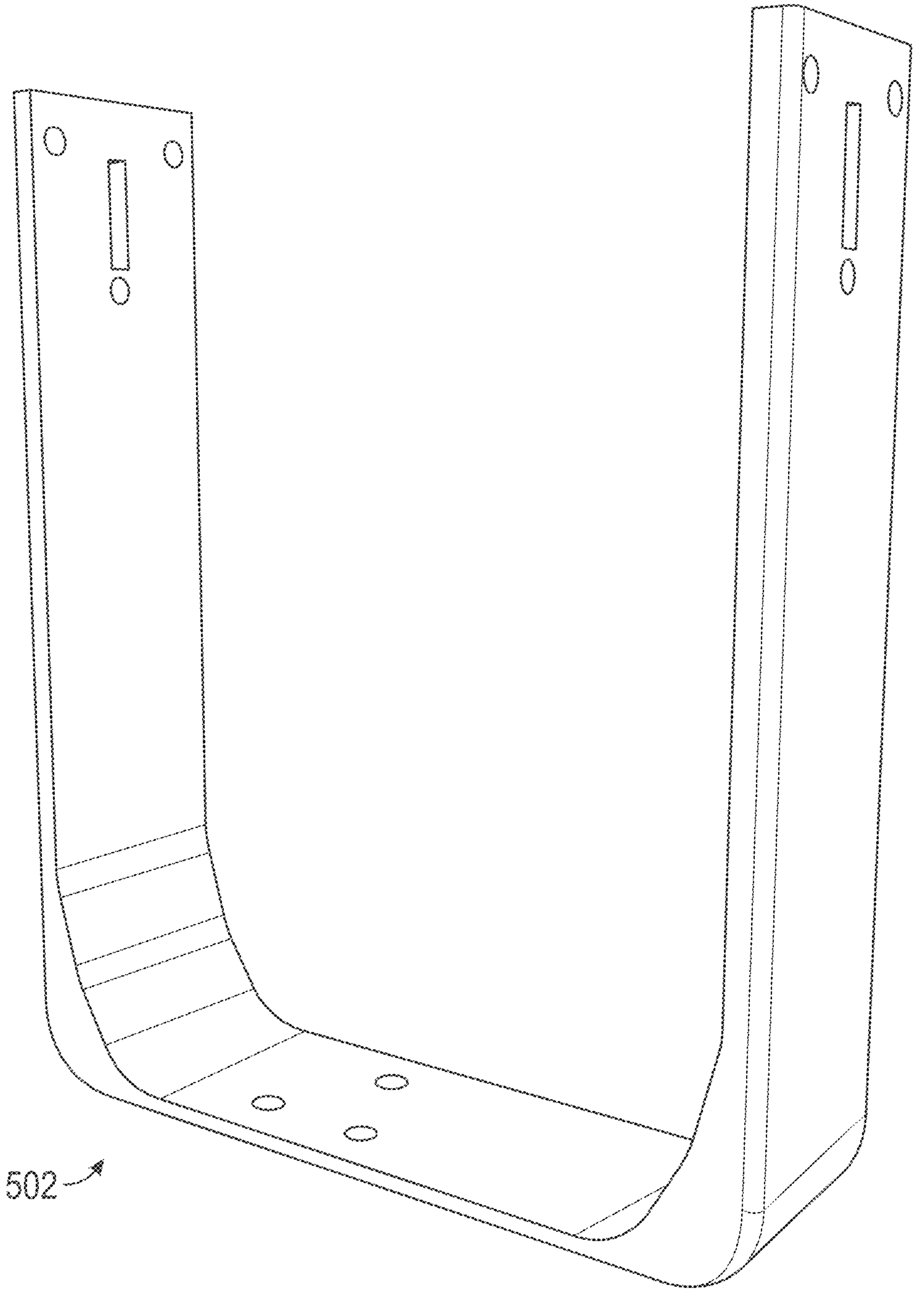
FIG. 5 depicts a perspective view of an example of a mounting bracket.

FIG. 5 depicts a mounting bracket 502 according to an embodiment. The mounting bracket 502 provides a structure for attaching the release mechanism 104 to the aerial vehicle 106. In the illustrated embodiment, the mounting bracket 502 is dimensioned to attach to a DJI MATRICE 210 V2 drone. In the illustrated embodiment, the mounting bracket 502 is substantially U-shaped. Multiple channels and slots are formed in the mounting bracket 502 for attachment to the aerial vehicle 106 and to the release mechanism 104. In the illustrated embodiment, the mounting bracket 502 may be fastened to the aerial vehicle 106 and to the release mechanism 104 by various means of fastening, such as adhesive, tape, screws, bolts, clamps, ties, rope, or the like. In some embodiments, the mounting bracket 502 may be omitted entirely, and the release mechanism 104 may be attached directly to the aerial vehicle 106. It is to be understood that in some embodiments, the mounting bracket 502 may comprise a different shape or structure to accommodate the specific type of aerial vehicle 106 or release mechanism 104 being used.

In some embodiments, the dropper mount 213 may be fastened to the mounting bracket 502 and to the dropper device 225 by various means of fastening, such as adhesive, tape, screws, bolts, clamps, ties, rope, or the like. It is to be understood that in some embodiments, the dropper mount 213 may comprise a different shape or structure to accommodate the specific type of dropper device 225 being used. In some embodiments, the dropper mount 213 may be omitted entirely, and the dropper device 225 may be attached directly to the mounting bracket 502 or aerial vehicle 106. Various embodiments can have different widths of dropper mount 213, different heights of dropper mount 213 and different lengths of dropper mount 213.

In the illustrated embodiment, the mounting bracket 502 and dropper mount 213 are 3-D printed components made from a plastic or other similar material. In other embodiments, the mounting bracket 502 and dropper mount 213 may be made from any suitable material such as rubber, plastic, metal, ceramic, polymers, wood, fabric, or the like. Additionally, in other embodiments, the mounting bracket 502 and dropper mount 213 may be manufactured using any suitable manufacturing method such as molding, casting, machining, carving, or the like.

FIG. 6 depicts a release mechanism 104 attached to an aerial vehicle 106. The aerial vehicle 106 depicted in the figure comprises an unmanned aerial vehicle. In the illustrated embodiment, the mounting bracket 502 of FIG. 6 is affixed to the unmanned aerial vehicle. A release mechanism 104 comprising a wireless receiver 404, a dropper device 225, a flywheel driver 226, and a power source 406 is affixed to mounting bracket 502. In the illustrated embodiment, the dropper device 225 is attached to the mounting bracket 502 via a dropper mount 213. The top portion of the dropper mount 213 can be attached to the mounting bracket 502. In some embodiments, the wireless receiver 404 and/or power source 406 may be attached to the mounting bracket 502 via hook and loop fasteners, or other fastening means. In the illustrated embodiment, the wireless receiver 404 is attached via a hook and loop fastener that is located on the side of the mounting bracket 502. In other embodiments, one or more of the components of the release mechanism 104 may be attached at any location on the mounting bracket 502.

The release mechanism 104 and mounting bracket 502 may be securely attached to the aerial vehicle 106 such that there are no wobbly or loose components. In the illustrated embodiment, the mounting bracket 502 and release mechanism 104 are affixed to the undercarriage of the aerial vehicle 106. This placement allows for the delivery device 102 to be released without interfering with the flight of the aerial vehicle 106. In other embodiments, the release mechanism 104 and mounting bracket 502 may be affixed to other locations on the aerial vehicle 106 such as the top, sides, front, back, wings, or interior.

In the illustrated embodiment, the release mechanism 104 is coupled to the aerial vehicle 106. The delivery device 102 may be detachably coupled to the release mechanism 104. Upon release or decoupling of the delivery device 102 from the release mechanism 104, the release mechanism 104 remains attached to the aerial vehicle 106. Thus, in the illustrated embodiment, the release mechanism 104 is able to operate as physically independent system from the delivery device 102. In other embodiments, the release mechanism 104 may be integrated into the delivery device 102. If the release mechanism 104 is integrated into the delivery device 102, the release mechanism 104 may fall with the delivery device 102 upon release from the aerial vehicle 106.

FIG. 6 depicts the system 100 after the delivery device 102 has been released from the release mechanism 104. After being released by the release mechanism 104, the delivery device 102 free falls along axis A-A until it impacts the target surface. FIG. 6 depicts the swing arm 223 in the second position in which the delivery device 102 is able to slide out of the slot 234.

Figure 7:
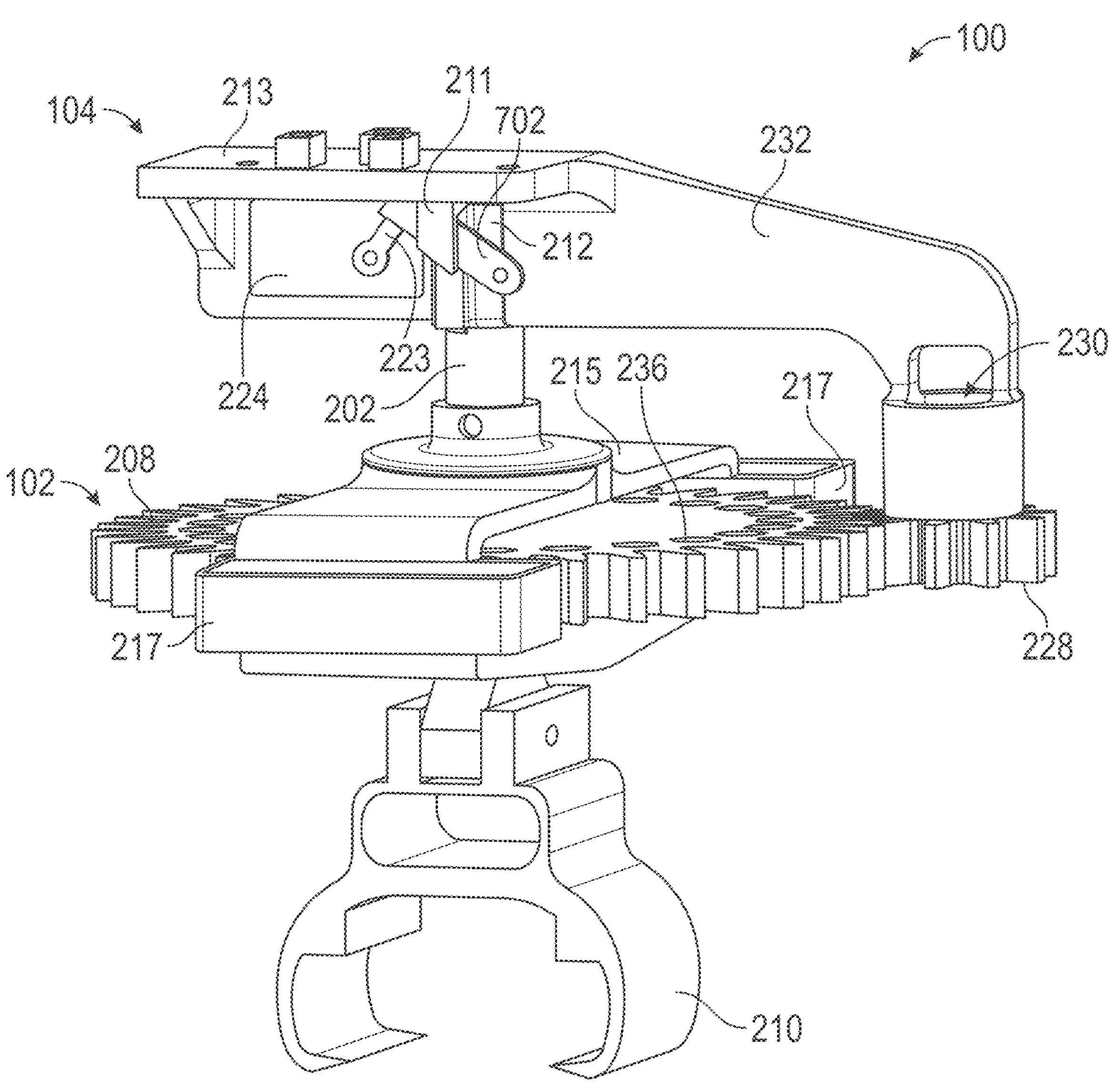
FIG. 7 depicts an alternative embodiment of an example system for deploying a payload from an aerial vehicle onto a target surface.

It is to be understood by a person having ordinary skill in the art that the exact configuration of elements shown in the figures is not the only configuration of elements that can be used to perform the invention. For instance, FIG. 7 depicts a system 100 according to an alternative embodiment as compared to the embodiment depicted in FIG. 2 and FIG. 3. The system 100 depicted in FIG. 7 includes a delivery device 102 and a release mechanism 104. The delivery device 102 can include an axle 202, a flywheel 208, an attachment portion 212, a payload holder 210, a flywheel bracket 215, and/or one or more floatation devices 214. The release mechanism 104 can include a dropper mount 213, a dropper device 225, a flywheel driver 226, and/or a slot 234. Compared to the embodiment depicted in FIGS. 2-3, the system 100 depicted in FIG. 7 includes a dropper mount 213 configured to receive a differently configured flywheel motor 230 and/or drive gear 228. Specifically, the distal end of the elongated portion 232 of the dropper mount 213 includes a substantially cylindrical housing for receiving the flywheel motor 230. Additionally, the drive gear 228 has a smaller diameter with fewer teeth. The illustrated embodiment also depicts a flywheel 208 with an increased number of flywheel weights 236 for increasing the total weight of the flywheel 208.

As illustrated in FIG. 7, the dropper device 225 can include a dropper motor 224, a swing arm 223, and a latch arm 702. Compared to the swing arm 223 depicted in FIGS. 2-3, the swing arm 223 depicted in FIG. 7 is a shortened swing arm 223. In the illustrated embodiment, the swing arm 223 does not extend across the slot 234. The embodiment of FIG. 7 also includes a latch arm 702 coupled to dropper mount 213. The swing arm 223 is coupled to and driven by the dropper motor 224. The latch arm 702 may not be driven by a motor. The swing arm 223 is attached to the dropper mount 213 on one side of the slot 234. The latch arm 702 is attached to the dropper mount 213 on the opposite side of the slot 234. The latch arm 702 is coupled to the dropper mount 213 at a position proximal to the elongated portion 232 of the dropper mount 213. The latch arm 702 is configured to extend across the slot 234 in the dropper mount 213.

The latch arm 702 and swing arm 223 are configured to be moveable between a first position in which the delivery device 102 can be securely coupled to the release mechanism 104 and a second position in which the delivery device 102 is not securely coupled to the release mechanism 104. Specifically, when the swing arm 223 and latch arm 702 are in the first position, the latch arm 702 is positioned under the protrusion 211 of the attachment portion 212 in an angled-up position. In the first position, the swing arm 223 contacts a distal end of the latch arm 702 and secures it in place. In the first position, the latch arm 702 extends across the slot 234 and obstructs it so that the attachment portion 212 cannot slide out. The second position can refer to when the swing arm 223 and the latch arm 702 are in a position in which the latch arm 702 does not obstruct the slot 234. For instance, when in the second position the swing arm 223 and the latch arm 702 may be angled away from the slot 234 so that no portion of the swing arm 223 or latch arm 702 obstructs the slot 234. In operation, a user may position the swing arm 223 and latch arm 702 to the second position to allow the attachment portion 212 of the delivery device 102 to be inserted into the slot 234 on the dropper mount 213. After the attachment portion 212 is inserted into the slot 234, the latch arm 702 and swing arm 223 can be moved to the first position to securely couple the delivery device 102 to the release mechanism 104. In this first position, the latch arm 702 extends under a protrusion 211 of the attachment portion 212, thereby locking the delivery device 102 into the slot 234. When in the first position, the delivery device 102 is unable to be pulled out of the slot 234. When in the first position, the delivery device 102 can be securely coupled to the release mechanism 104 such that the delivery device 102 does not unintentionally detach from the aerial vehicle 106 during flight of the aerial vehicle 106. When the delivery device 102 is desired to be released or removed from the release mechanism 104, the motor may be used to move the swing arm 223 to the second position. When the swing arm 223 is moved to the second position, the swing arm 223 no longer provides support to the latch arm 702 and the latch arm 702 can fall out of the first position. With the latch arm 702 no longer obstructing the attachment portion 212, the delivery device 102 can slide out of the slot 234 due to the downward pull of gravity on the delivery device 102.

Figure 8:
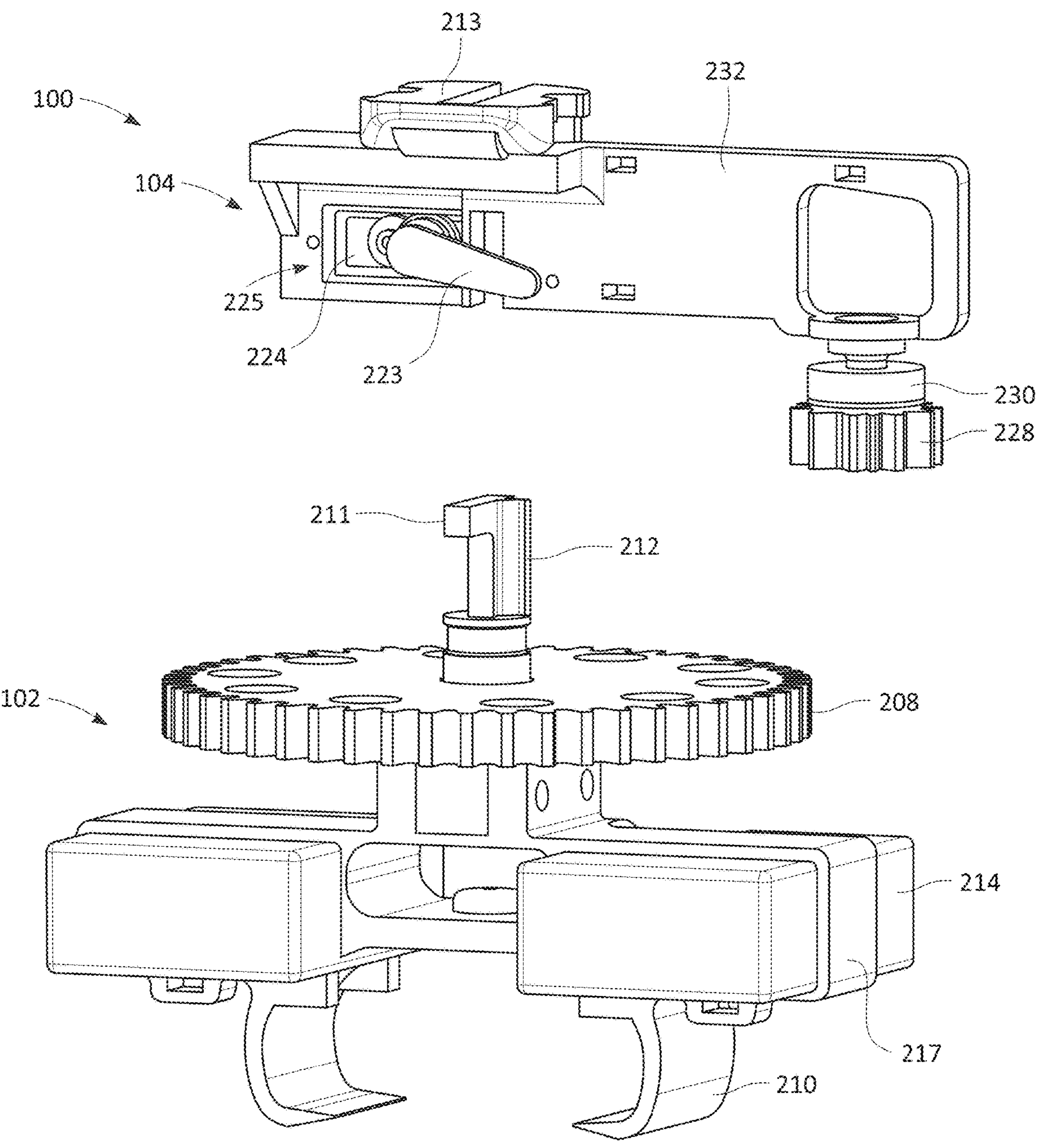
FIG. 8 depicts another alternative embodiment of an example system for deploying a payload from an aerial vehicle onto a target surface.

FIG. 8 depicts another alternative embodiment of a system 100 for deploying a payload 114 from an aerial vehicle 106 onto a target surface 112. As shown in FIG. 8, the system 100 can include a delivery device 102 and a release mechanism 104. FIG. 8 depicts the delivery device 102 after being released from the release mechanism 104. Except for any differences depicted in FIG. 8 and described below, the system 100 shown in FIG. 8 and its subcomponents can be identical to the system 100 depicted in FIGS. 2-3. As shown in FIG. 8, the delivery device 102 can include one or more floatation brackets 217 disposed below the flywheel 208. For example, the delivery device 102 can include one or more floatation brackets 217 coupled to the payload holder 210. With reference to FIG. 8, two floatation brackets 217 can extend from opposing sides of the payload holder 210. In other embodiments, the delivery device 102 can include one, two, three, or any other number of floatation brackets 217. Each floatation bracket 217 can secure a floatation device 214 to the delivery device 102. As shown in FIG. 8, each floatation bracket 217 can include an opening for receiving a floatation device 214. In other embodiments, the floatation bracket 217 can include or be substituted for any other structure suitable for securing a floatation device 214 to the delivery device 102 (e.g., adhesives, mechanical fasteners, hook and loop fasteners, etc.) As shown in FIG. 8, in some embodiments, the delivery device 102 may not include a flywheel bracket 215.

Figure 9:
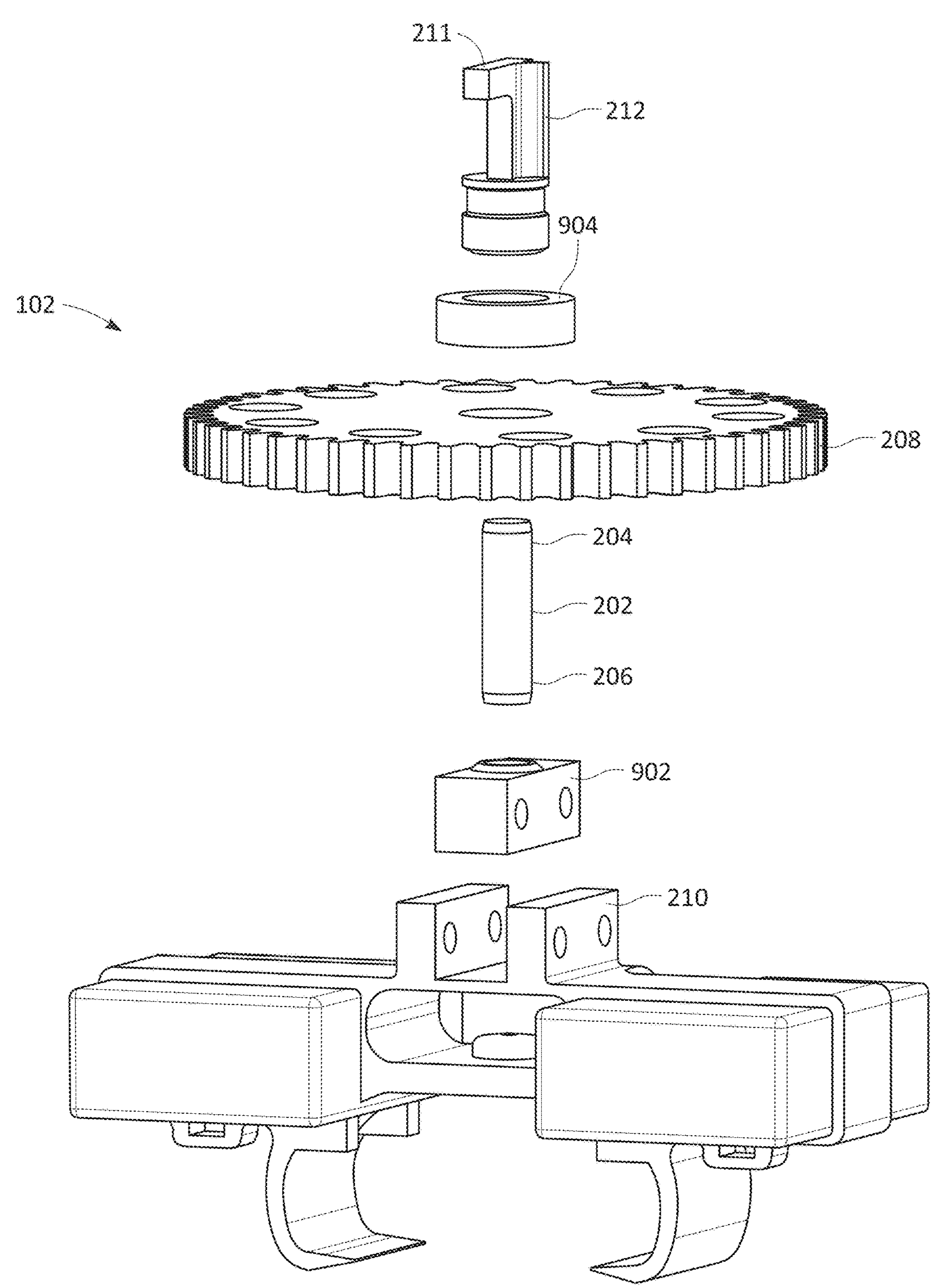
FIG. 9 depicts an exploded view of the delivery device shown in FIG. 8

FIG. 9 depicts an exploded view of the delivery device 102 of FIG. 8. As shown in FIG. 9, the delivery device 102 can include a payload holder 210, a flywheel 208, an attachment portion 212, and axle 202, a connector portion 902, and a bearing 904. As shown in FIG. 9, the axle 202, the attachment portion 212, and the connector portion 902 can each be formed as separate components. When in an assembled state (shown in FIG. 8), a first end 204 of the axle 202 can be coupled to the attachment portion 212. A second end 206 of the axle 202 can be coupled to the connector portion 902. In some embodiments, the axle 202 can be a stainless steel pin. The flywheel 208 can be rotatably coupled to the axle 202. The flywheel 208 can be interposed between the attachment portion 212 and the connector portion 902. The bearing 904 (e.g., a ball bearing) can be coupled to the central opening of the flywheel 208 to facilitate rotation of the flywheel 208 around the axle 202. The connector portion 902 can be coupled to the payload holder 210. The connector portion 902 can include a slot for receiving a second end 206 of the axle 202. The axle 202, the attachment portion 212, the connector portion 902, and the payload holder 210 can each be coupled to one another by any suitable fastening technique, including but not limited to mechanical fasteners (e.g., bolts, screws, etc.), adhesives, material bonding, mechanical friction, or the like. In other embodiments, any one or more of the axle 202, the attachment portion 212, the connector portion 902, and the payload holder 210 can be integrally formed as a single unitary piece.

Various systems and methods are described herein primarily in the context of using a drone to deploy a biologging tag or other tracking device onto a whale. However, the inventors contemplate applicability of the disclosed systems and methods to any of a wide variety of alternative applications.

As used in the description and claims, the singular form "a", "an" and "the" include both singular and plural references unless the context clearly dictates otherwise. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

CERTAIN EMBODIMENTS RELATING TO METHODS AND SYSTEMS FOR DEPLOYING A PAYLOAD FROM AN AERIAL SURFACE ONTO A TARGET SURFACE

The following are non-limiting examples of certain embodiments of systems and methods for deploying a payload onto a target surface from an aerial vehicle. Other embodiments may include one or more other features, or different features, other than what is disclosed herein.

Embodiment 1: A system for deploying a payload from an aerial vehicle onto a target surface, the system comprising: a delivery device comprising: an axle; a flywheel rotatable around the axle, wherein the flywheel is configured to rotate about an axis parallel to a fall direction of the payload; an attachment portion coupled to the axle; and a payload holder coupled to the axle, wherein the payload holder is detachably couplable to the payload, wherein the payload holder is configured to detach from the payload in response to the delivery device impacting the target surface; and a release mechanism coupled to the aerial vehicle, the release mechanism comprising: a dropper mount configured to be coupled to the aerial vehicle, the dropper mount comprising a slot configured to receive the attachment portion of the delivery device; a dropper device coupled to the dropper mount, the dropper device comprising: a swing arm moveable between a first position in which the attachment portion is secured in the slot by the swing arm and a second position in which the attachment portion is not secured in the slot by the swing arm; and a dropper motor configured to move the swing arm between the first position and the second position; and a flywheel driver coupled to the dropper mount, the flywheel driver comprising: a drive gear configured to drive the flywheel; and a flywheel motor configured to drive the drive gear.

Embodiment 2: The system of claim 1, wherein the dropper mount further comprises an elongated portion extending towards an outer diameter of the flywheel, wherein the flywheel driver is coupled to the elongated portion.

Embodiment 3: The system of claim 1, wherein the payload holder comprises a pair of arms configured to wrap around the payload.

Embodiment 4: The system of claim 1, further comprising a floatation device coupled to the delivery device.

Embodiment 5: The system of claim 4, wherein the delivery device further comprises a floatation bracket extending around an outer diameter of the flywheel, wherein the floatation device is coupled to the floatation bracket.

Embodiment 6: The system of claim 1, wherein the flywheel is a gear.

Embodiment 7: The system of claim 1, wherein a mass of the flywheel is biased towards an outer circumference of the flywheel.

Embodiment 8: The system of claim 1, further comprising a weight coupled to the payload holder.

Embodiment 9: The system of claim 1, further comprising a mounting bracket couplable to the aerial vehicle, wherein the mounting bracket is configured to secure the release mechanism to the aerial vehicle.

Embodiment 10: The system of claim 1, wherein the aerial vehicle comprises an unmanned aerial vehicle.

Embodiment 11: The system of claim 1, wherein the target surface comprises a surface on a marine mammal.

Embodiment 12: The system of claim 1, wherein the target surface comprises a moving surface.

Embodiment 13: The system of claim 1, wherein the payload comprises a biologging tag.

Embodiment 14: A system for deploying a payload from an aerial vehicle onto a target surface, the system comprising: a delivery device detachably couplable to the aerial vehicle, the delivery device comprising: an axle; a flywheel rotatable around the axle, wherein the flywheel is configured to rotate about an axis parallel to a fall direction of the payload; and a payload holder coupled to the axle, wherein the payload holder is configured to be coupled to a payload.

Embodiment 15: The system of claim 14, wherein the payload holder is detachably couplable to the payload, wherein the payload holder is configured to detach from the payload in response to the payload impacting the target surface.

Embodiment 16: The system of claim 14, wherein the delivery device further comprises an attachment portion coupled to axle, wherein the attachment portion is detachably couplable to the aerial vehicle.

Embodiment 17: The system of claim 14, further comprising a floatation device coupled to the delivery device.

Embodiment 18: The system of claim 17, wherein the delivery device further comprises a floatation bracket extending around an outer diameter of the flywheel, wherein the floatation device is coupled to the floatation bracket.

Embodiment 19: The system of claim 14, wherein the flywheel is a gear.

Embodiment 20: The system of claim 14, wherein a mass of the flywheel is biased towards an outer circumference of the flywheel.

Embodiment 21: The system of claim 14, wherein the payload holder comprises a pair of arms configured to wrap around the payload.

Embodiment 22: The system of claim 14, further comprising a weight coupled to the payload holder.

Embodiment 23: A release mechanism for releasing a delivery device from an aerial vehicle, the release mechanism comprising: a dropper mount configured to be coupled to the aerial vehicle, the dropper mount comprising a slot configured to receive the delivery device; a dropper device coupled to the dropper mount, the dropper device comprising: a swing arm moveable between a first position in which the delivery device is secured in the slot by the swing arm and a second position in which the delivery device is not secured in the slot by the swing arm; and a dropper motor configured to move the swing arm between the first position and the second position; and a flywheel driver coupled to the dropper mount, the flywheel driver comprising: a drive gear configured to drive a flywheel; and a flywheel motor configured to drive the drive gear.

Embodiment 24: The release mechanism of claim 23, further comprising a wireless receiver configured to receive a signal from a transmitter, wherein the wireless receiver is electrically coupled to the dropper device, wherein the dropper device is configured to release the delivery device in response to the wireless receiver receiving a signal from the transmitter to release the delivery device.

Embodiment 25: The release mechanism of claim 23, wherein the dropper mount further comprises an elongated portion extending towards an outer diameter of the flywheel, wherein the flywheel driver is coupled to the elongated portion.

Embodiment 26: A method for deploying a payload from an aerial vehicle onto a target surface, the method comprising: detachably coupling a delivery device to the aerial vehicle, wherein the payload is coupled to the delivery device; spinning up a flywheel coupled to the delivery device; positioning the aerial vehicle above the target surface; detaching the delivery device from the aerial vehicle; and impacting the payload onto the target surface.

Embodiment 27: The method of claim 26, wherein the payload is detachably coupled to the delivery device.

Embodiment 28: The method of claim 26, wherein detaching the delivery device from the payload occurs in response to impacting the payload onto the target surface.

Embodiment 29: The method of claim 26, wherein detaching the delivery device from the payload comprises moving a swing arm coupled to a release mechanism from a first position in which the delivery device is secured to the release mechanism to a second position in which the delivery device is not secured to the release mechanism.

Embodiment 30: The method of claim 26, wherein positioning the aerial vehicle above the target surface comprises positioning the aerial vehicle above a body of an animal.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for deploying a payload from an aerial vehicle onto a target surface, the system comprising:

a delivery device deployable from the aerial vehicle and configured to stabilize an orientation of the payload during free-fall from the aerial vehicle, the delivery device comprising:

an axle;

a flywheel rotatable around the axle, wherein the flywheel is configured to rotate about an axis parallel to a fall direction of the payload during free-fall of the delivery device from the aerial vehicle; and a payload holder coupled to the axle, wherein the payload holder is configured to be coupled to the payload; and a release mechanism configured to be coupled to the aerial vehicle and configured to release the delivery device from the aerial vehicle, the release mechanism comprising:

a flywheel driver comprising:

a drive gear configured to drive the flywheel; and a flywheel motor configured to drive the drive gear.

2. The system of claim 1, wherein the release mechanism further comprises:

a dropper mount configured to be coupled to the aerial vehicle, the dropper mount comprising a slot configured to receive the delivery device;

a dropper device coupled to the dropper mount, the dropper device comprising:

a swing arm moveable between a first position in which the delivery device is secured in the slot by the swing arm and a second position in which the delivery device is not secured in the slot by the swing arm; and a dropper motor configured to move the swing arm between the first position and the second position.

3. The system of claim 1, wherein the payload holder comprises a pair of arms configured to wrap around the payload.

4. The system of claim 1, further comprising a floatation device coupled to the delivery device.

5. The system of claim 1, wherein the payload comprises a biologging tag.

6. A system for deploying a payload from an aerial vehicle onto a target surface, the system comprising:

a delivery device deployable from the aerial vehicle and configured to stabilize an orientation of the payload during free-fall from the aerial vehicle, the delivery device comprising:

an axle;

a flywheel rotatable around the axle, wherein the flywheel is configured to rotate about an axis parallel to a fall direction of the payload during free-fall of the delivery device from the aerial vehicle; and a payload holder coupled to the axle, wherein the payload holder is configured to be coupled to the payload.

7. The system of claim 6, wherein the payload holder is detachably couplable to the payload, wherein the payload holder is configured to detach from the payload in response to the payload impacting the target surface.

8. The system of claim 6, wherein the delivery device further comprises an attachment portion coupled to the axle, wherein the attachment portion is detachably couplable to the aerial vehicle.

9. The system of claim 6, further comprising a floatation device coupled to the delivery device.

10. The system of claim 9, wherein the delivery device further comprises a floatation bracket configured to secure the floatation device to the delivery device.

11. The system of claim 6, wherein the flywheel is a gear.

12. The system of claim 6, wherein a mass of the flywheel is biased towards an outer circumference of the flywheel.

13. The system of claim 6, further comprising a release mechanism for releasing the delivery device from the aerial vehicle, the release mechanism comprising:

a dropper mount configured to be coupled to the aerial vehicle, the dropper mount comprising a slot configured to receive the delivery device;

a dropper device coupled to the dropper mount, the dropper device comprising:

a swing arm moveable between a first position in which the delivery device is secured in the slot by the swing arm and a second position in which the delivery device is not secured in the slot by the swing arm; and a dropper motor configured to move the swing arm between the first position and the second position; and a flywheel driver coupled to the dropper mount, the flywheel driver comprising:

a drive gear configured to drive a flywheel; and a flywheel motor configured to drive the drive gear.

14. The system of claim 13, further comprising a wireless receiver configured to receive a signal from a transmitter, wherein the wireless receiver is electrically coupled to the dropper device, wherein the dropper device is configured to release the delivery device in response to the wireless receiver receiving a signal from the transmitter to release the delivery device.

15. The system of claim 13, wherein the dropper mount further comprises an elongated portion extending towards an outer diameter of the flywheel, wherein the flywheel driver is coupled to the elongated portion.

16. A method for deploying a payload from an aerial vehicle onto a target surface, the method comprising:

detachably coupling a delivery device to the aerial vehicle;

coupling the payload to a payload holder of the delivery device;

spinning up a flywheel of to the delivery device, wherein the flywheel is rotatable around an axle of the delivery device and configured to rotate about an axis parallel to a fall direction of the payload during free-fall of the delivery device from the aerial vehicle;

positioning the aerial vehicle above the target surface;

detaching the delivery device from the aerial vehicle, wherein the delivery device is configured to stabilize an orientation of the payload during free-fall from the aerial vehicle; and impacting the payload onto the target surface.

17. The method of claim 16, wherein the payload is detachably coupled to the delivery device.

18. The method of claim 16, wherein detaching the delivery device from the payload occurs in response to impacting the payload onto the target surface.

19. The method of claim 16, wherein detaching the delivery device from the payload comprises moving a swing arm coupled to a release mechanism from a first position in which the delivery device is secured to the release mechanism to a second position in which the delivery device is not secured to the release mechanism.

20. The method of claim 16, wherein positioning the aerial vehicle above the target surface comprises positioning the aerial vehicle above a body of an animal.

* * * * *